United States Patent
Endo et al.

(10) Patent No.: US 9,742,201 B2
(45) Date of Patent: Aug. 22, 2017

(54) WIRELESS POWER RECEIVING APPARATUS

(71) Applicant: ADVANTEST CORPORATION, Tokyo (JP)

(72) Inventors: Yuki Endo, Tokyo (JP); Yasuo Furukawa, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 423 days.

(21) Appl. No.: 14/469,378

(22) Filed: Aug. 26, 2014

(65) Prior Publication Data

US 2014/0361636 A1    Dec. 11, 2014

Related U.S. Application Data

(63) Continuation of application No. PCT/JP2013/000846, filed on Feb. 15, 2013.

(30) Foreign Application Priority Data

Mar. 6, 2012    (JP) ................................ 2012-049661

(51) Int. Cl.
  *H02J 5/00*    (2016.01)
  *H02J 17/00*    (2006.01)
(52) U.S. Cl.
  CPC .............. *H02J 5/005* (2013.01); *H02J 17/00* (2013.01)
(58) Field of Classification Search
  None
  See application file for complete search history.

(56) References Cited

U.S. PATENT DOCUMENTS

| | | | |
|---|---|---|---|
| 2003/0227340 A1* | 12/2003 | Koo | ..................... H03B 5/1265 331/177 R |
| 2009/0061768 A1* | 3/2009 | Simada | ................ G06K 7/0008 455/41.1 |
| 2012/0068548 A1* | 3/2012 | Endo | ....................... H02J 5/005 307/104 |

FOREIGN PATENT DOCUMENTS

| JP | 08-501435 | 2/1996 |
|---|---|---|
| JP | 11-155245 | 6/1999 |
| JP | 2007-252049 | 9/2007 |
| JP | 2011-044036 | 3/2011 |

(Continued)

OTHER PUBLICATIONS

Office Action issued for corresponding Japanese Patent Application No. 2012-049661 dated Jan. 6, 2015 and its English translation by the clients.

(Continued)

*Primary Examiner* — Jared Fureman
*Assistant Examiner* — Aqeel Bukhari
(74) *Attorney, Agent, or Firm* — Cantor Colburn LLP

(57) ABSTRACT

A wireless power transmitting apparatus transmits an electric power signal comprising any one from among an electric field, a magnetic field, and an electromagnetic field to a wireless power receiving apparatus. A transmission antenna includes a transmission coil. An automatic tuning assist circuit is coupled in series with the transmission antenna. A power supply applies an AC driving voltage across both terminals of a series circuit that comprises the transmission antenna and the automatic tuning assist circuit. A first controller switches on and off multiple switches in synchronization with the driving voltage. A voltage monitoring unit monitors the voltage that develops at an auxiliary capacitor.

14 Claims, 32 Drawing Sheets

(56) References Cited

FOREIGN PATENT DOCUMENTS

| | | |
|---|---|---|
| JP | 2011-083178 | 4/2011 |
| JP | 2011-244684 | 12/2011 |
| JP | 2013-524743 | 6/2013 |
| TW | 201010235 A | 3/2010 |
| WO | 93-23908 | 11/1993 |
| WO | 2011/122048 | 10/2011 |
| WO | 2012-164845 | 12/2012 |

OTHER PUBLICATIONS

IPRP with WO of ISA corresponding PCT/JP2013/000846 issued on Sep. 9, 2014 along with its English translation.
ISR for corresponding PCT/JP2013/000846 mailed on Mar. 12, 2013 along with its English translation.
Karlis, et al. "Efficient wireless non-radiative mid-range energy transfer." Annals of Physics 323 (2008) 34-48.

* cited by examiner

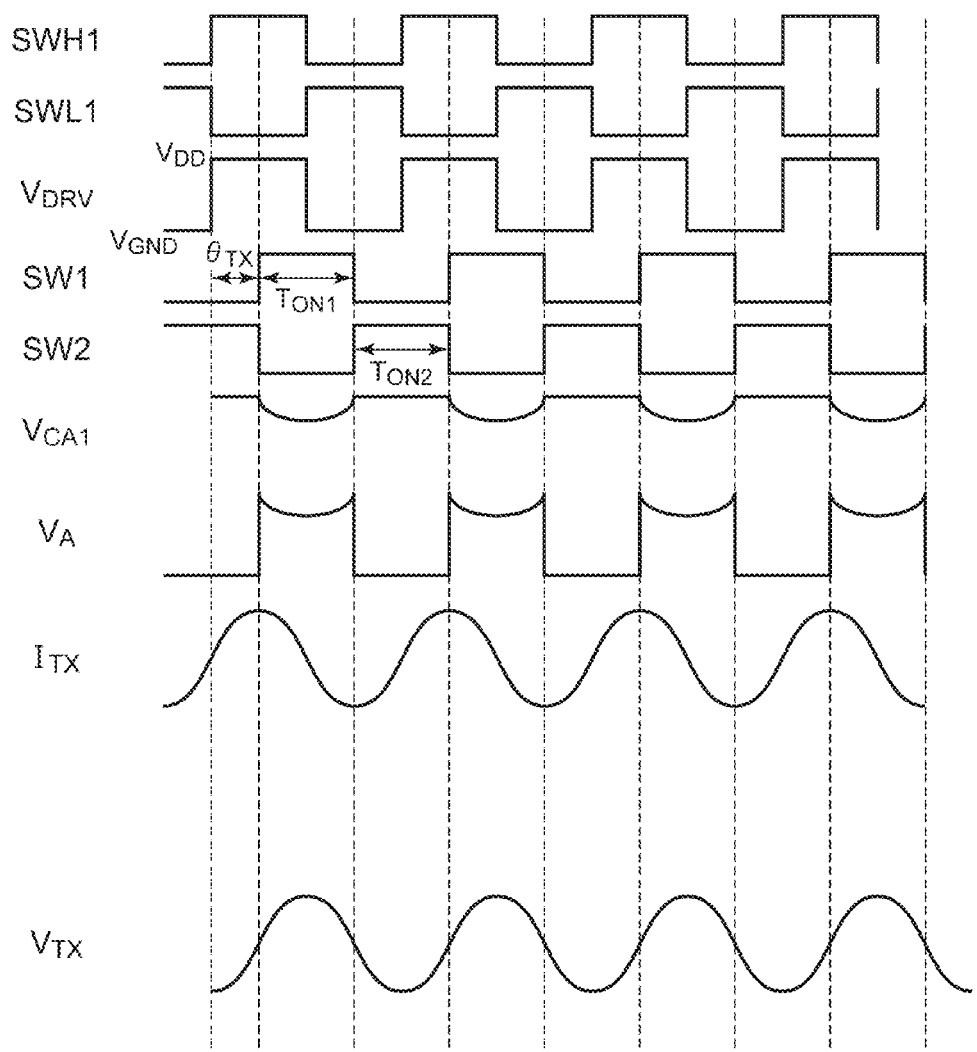

2d

2e

4a

4b

4d

4e

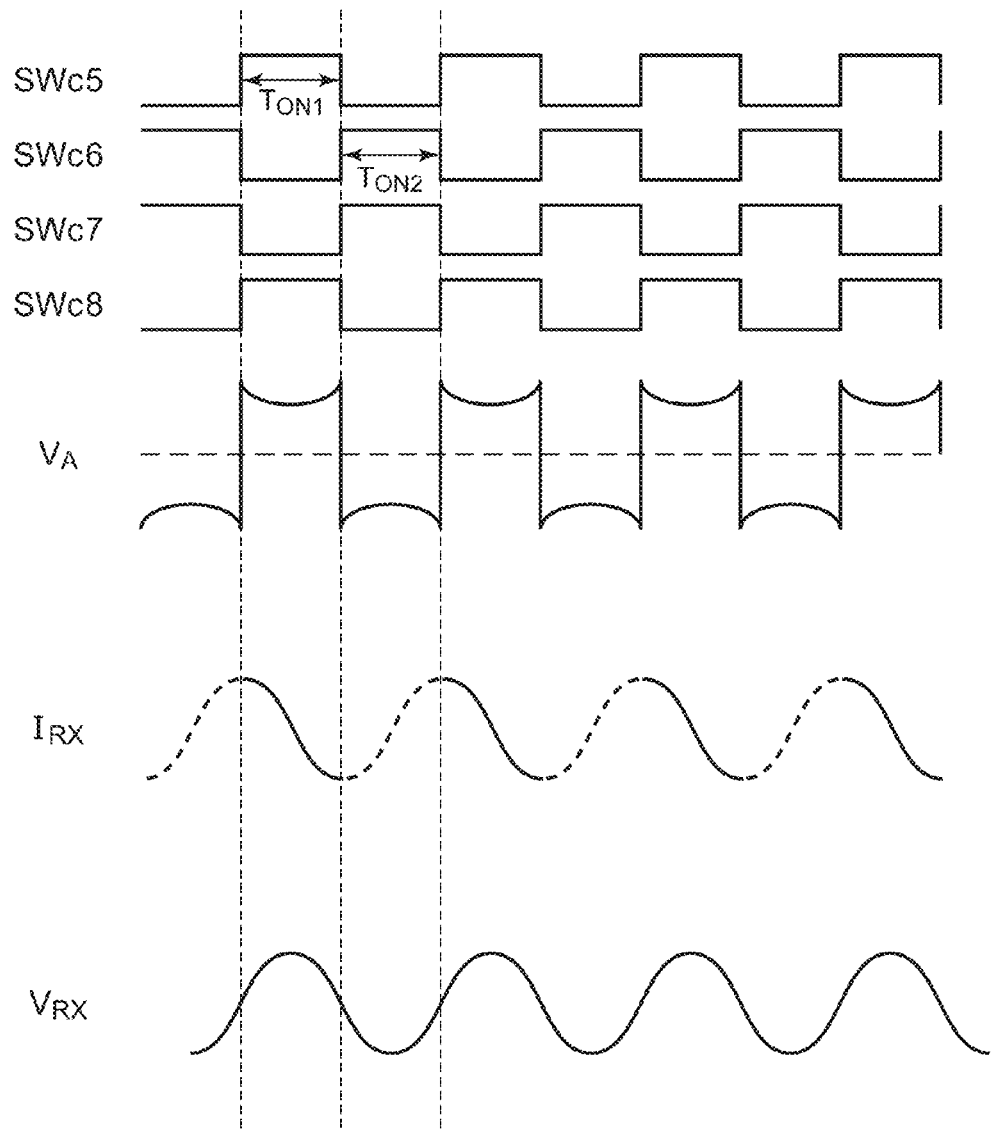

WIRELESS POWER RECEIVING APPARATUS

CROSS-REFERENCE TO RELATED APPLICATIONS

This application is a Continuation of International Patent Application No. PCT/JP2013/000846, filed on Feb. 15, 2013, which claims priority to Japanese Patent Application No. 2012-049661, filed on Mar. 6, 2012, the disclosures of which are hereby incorporated by reference in their entireties.

BACKGROUND OF THE INVENTION

1. Field of the Invention

The present invention relates to a wireless power supply technique.

2. Description of the Related Art

In recent years, wireless (contactless) power transmission has been receiving attention as a power supply technique for electronic devices such as cellular phone terminals, laptop computers, etc., or for electric vehicles. Wireless power transmission can be classified into three principal methods using an electromagnetic induction, an electromagnetic wave reception, and an electric field/magnetic field resonance.

The electromagnetic induction method is employed to supply electric power at a short range (several cm or less), which enables electric power of several hundred watts to be transmitted in a band that is equal to or lower than several hundred kHz. The power use efficiency thereof is on the order of 60% to 98%. In a case in which electric power is to be supplied over a relatively long range of several meters or more, the electromagnetic wave reception method is employed. The electromagnetic wave reception method allows electric power of several watts or less to be transmitted in a band between medium waves and microwaves. However, the power use efficiency thereof is small. The electric field/magnetic field resonance method has been receiving attention as a method for supplying electric power with relatively high efficiency at a middle range on the order of several meters. Rerated techniques have been disclosed in "A. Karalis, J. D. Joannopoulos, M. Soljacic, "Efficient wireless non-radiative mid-range energy transfer" ANNALS of PHYSICS Vol. 323, January 2008, pp. 34-48", for example.

FIG. 1 is a diagram showing a wireless power supply system according to a comparison technique. The wireless power supply system $1r$ includes a wireless power transmitting apparatus $2r$ and a wireless power receiving apparatus $4r$. The wireless power transmitting apparatus $2r$ includes a transmission coil $L_{TX}$, a resonance capacitor $C_{TX}$, and an AC power supply $10r$. The wireless power receiving apparatus $4r$ includes a reception coil $L_{RX}$, a resonance capacitor $C_{RX}$, and a load 70.

In such a wireless power supply system $1r$, in order to efficiently supply power, there is a need to satisfy the condition for resonance in the wireless power transmitting apparatus $2r$ and the wireless power receiving apparatus $4r$.

If a foreign substance such as a piece of metal is interposed between the transmission coil $L_{TX}$ and the reception coil $L_{RX}$ when the wireless power supply system 1 is in the resonant state, this leads to a change in the condition for resonance, and the resonant state is disturbed. Also, if the degree of coupling between the transmission coil $L_{TX}$ and the reception coil $L_{RX}$ changes due to movement of the wireless power receiving apparatus $4r$, this leads to a change in the condition for resonance, and the resonant state is disturbed. Alternatively, if there is power theft by a malicious user, the resonant state is also disturbed.

The wireless power supply system $1r$ may preferably be provided with a function of detecting a disturbance in the resonant state. Such an arrangement allows a tuning operation to be controlled according to the detection result, or allows the system to be protected using the detection result, which is convenient.

SUMMARY OF THE INVENTION

The present invention has been made in order to solve such a problem. Accordingly, it is an exemplary purpose of an embodiment of the present invention to provide a wireless power transmitting apparatus, wireless power receiving apparatus, and wireless power supply system having a function of detecting an event that disturbs the resonant state, such as the interposition of a foreign substance, power theft, and the like.

An embodiment of the present invention relates to a wireless power transmitting apparatus which transmits an electric power signal comprising any one from among an electric field, a magnetic field, and an electromagnetic field to a wireless power receiving apparatus. The wireless power transmitting apparatus comprises: a transmission antenna comprising a transmission coil; an automatic tuning assist circuit coupled in series with the transmission antenna; and a power supply which applies an AC driving voltage across a series circuit that comprises the transmission antenna and the automatic tuning assist circuit. The automatic tuning assist circuit comprises: a first terminal; a second terminal; N (N represents an integer) auxiliary capacitors; multiple switches each of which is arranged between two terminals from among the first terminal, the second terminal, and terminals of the N auxiliary capacitors; a first controller which switches on and off each of the multiple switches in synchronization with the driving voltage with a predetermined phase difference with respect to the driving voltage; and a voltage monitoring unit which monitors a voltage that develops at at least one from among the N auxiliary capacitors.

The resonance frequency of the resonance circuit, which is formed of the transmission antenna together with its peripheral circuit elements and the wireless power receiving apparatus, varies with the passage of time. When the frequency of the driving voltage does not match the resonance frequency of the resonance circuit including the transmission antenna, the resonance circuit functions as a capacitor circuit or otherwise an inductor circuit. In this case, in the transmission antenna, a current is induced with a phase that is delayed or otherwise advanced with respect to the phase of the driving voltage. In this state, in a case in which the multiple switches of the automatic tuning assist circuit are switched on and off with a predetermined phase difference with respect to the driving voltage, the N auxiliary capacitors are each charged or otherwise discharged so as to provide phase matching between the resonance current and the driving voltage. By applying the voltages (which will be referred to as the "capacitor voltages") that respectively develop at the N auxiliary capacitors to the transmission antenna, a quasi-resonant state is maintained. Such an embodiment is capable of automatically tuning the transmission antenna with respect to the driving voltage even without an operation such as adjusting the capacitance of the resonance capacitor. It should be noted that, in the present specification, the "phase difference" may be set to zero. That is to say, examples of the "phase difference" state include a phase matching state.

With such an arrangement, the capacitor voltages that develop at the N auxiliary capacitors change according to a change in the condition for resonance of the resonance circuit. Thus, by monitoring the capacitor voltage, such an arrangement is capable of detecting an event that disturbs the resonant state.

Another embodiment of the present invention relates to a wireless power receiving apparatus which receives an electric power signal comprising any one from among an electric field, a magnetic field, and an electromagnetic field transmitted from a wireless power receiving apparatus. The wireless power receiving apparatus comprises: a reception antenna comprising a reception coil; and an automatic tuning assist circuit coupled in series with the reception antenna. The automatic tuning assist circuit comprises: a first terminal; a second terminal; N (N represents an integer) auxiliary capacitors; multiple switches each of which is arranged between two terminals from among the first terminal, the second terminal, and terminals of the N auxiliary capacitors; a second controller which switches on and off each of the multiple switches in synchronization with the electric power signal; and a voltage monitoring unit which monitors a voltage that develops at at least one from among the N auxiliary capacitors.

The resonance frequency of the resonance circuit, which is formed of the reception antenna together with its peripheral circuit elements and the wireless power transmitting apparatus, varies with the passage of time. When the frequency of the electric power signal does not match the resonance frequency of the resonance circuit including the reception antenna, the resonance circuit functions as a capacitor circuit or otherwise an inductor circuit. In this case, there is a phase delay or otherwise a phase advance between the current that flows through the resonance circuit and the voltage that is induced in the resonance circuit. In this state, in a case in which the multiple switches are switched on and off in synchronization with the electric power signal, the N auxiliary capacitors are each charged or otherwise discharged so as to provide phase matching between the current and the voltage. By applying the voltages that develop at the auxiliary capacitors to the reception antenna, a quasi-resonant state is maintained. Such an embodiment is capable of automatically tuning the reception antenna with respect to the electric power signal even without an operation such as adjusting the capacitance of the resonance capacitor.

With such an arrangement, the capacitor voltages that develop at the N auxiliary capacitors change according to a change in the condition for resonance of the resonance circuit. Thus, by monitoring the capacitor voltage, such an arrangement is capable of detecting an event that disturbs the resonant state.

In the wireless power transmitting apparatus or otherwise the wireless power receiving apparatus according to an embodiment, the voltage monitoring unit may judge whether or not the voltage that develops at the auxiliary capacitor is within a predetermined range. When the wireless power supply system operates in a stable state, the capacitor voltage that develops at the auxiliary capacitor is stably within a predetermined range. In this case, if an event occurs that disturbs the resonant state, the capacitor voltage deviates from the predetermined range. With such an embodiment, by monitoring the range of changes of the capacitor voltage, such an arrangement is capable of detecting an event that disturbs the resonant state.

In the wireless power transmitting apparatus or otherwise the wireless power receiving apparatus according to an embodiment, the voltage monitoring unit may monitor a waveform obtained by time differentiating the voltage that develops at the auxiliary capacitor.

The capacitor voltage varies according to the normal tuning operation of the automatic tuning assist circuit. Such a variation occurs with a relatively long time scale. In contrast, variations due to abnormal events such as interposition of a foreign substance, the approach of a device terminal of a malicious user having the intention to engage in power theft, and the like, occur with a very short time scale. Thus, by monitoring the waveform obtained by time differentiating the capacitor voltage, such an arrangement is capable of distinguishing variations due to the normal tuning operation from variations due to abnormal events such as the interposition of a foreign substance, the approach of a device terminal of a malicious user having the intention of engaging in power theft, and the like.

Yet another embodiment of the present invention relates to a wireless power supply system. The wireless power supply system comprises at least one of the aforementioned wireless power transmitting apparatus and the aforementioned wireless power receiving apparatus.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is a waveform diagram showing the operation of the wireless power transmitting apparatus shown in FIG. 2;

FIG. 27 is a waveform diagram showing the operation of the wireless power receiving apparatus shown in FIG. 26;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

First Embodiment

Wireless Power Transmitting Apparatus

Figure 1:
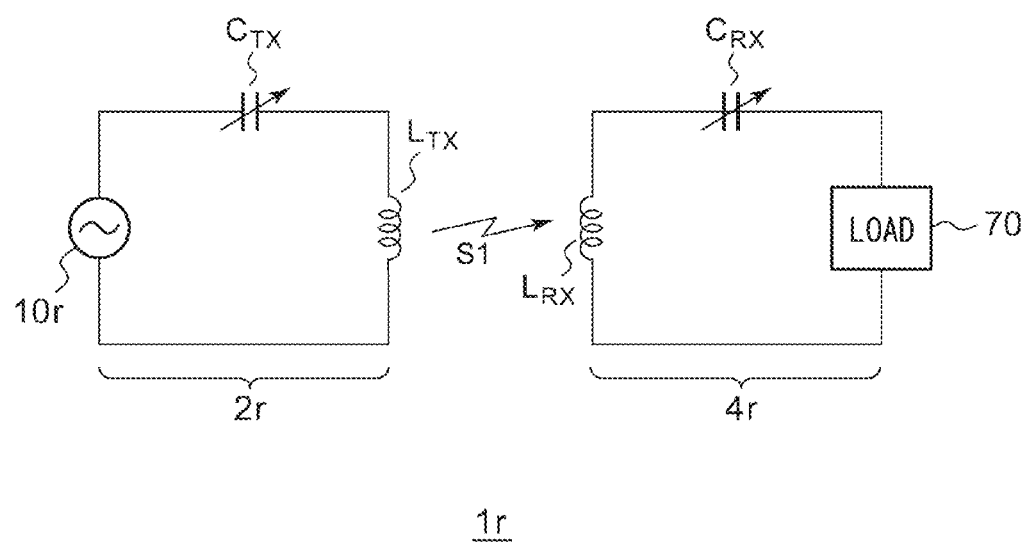
FIG. 1 is a diagram showing a wireless power supply system according to a comparison technique.
Figure 2:
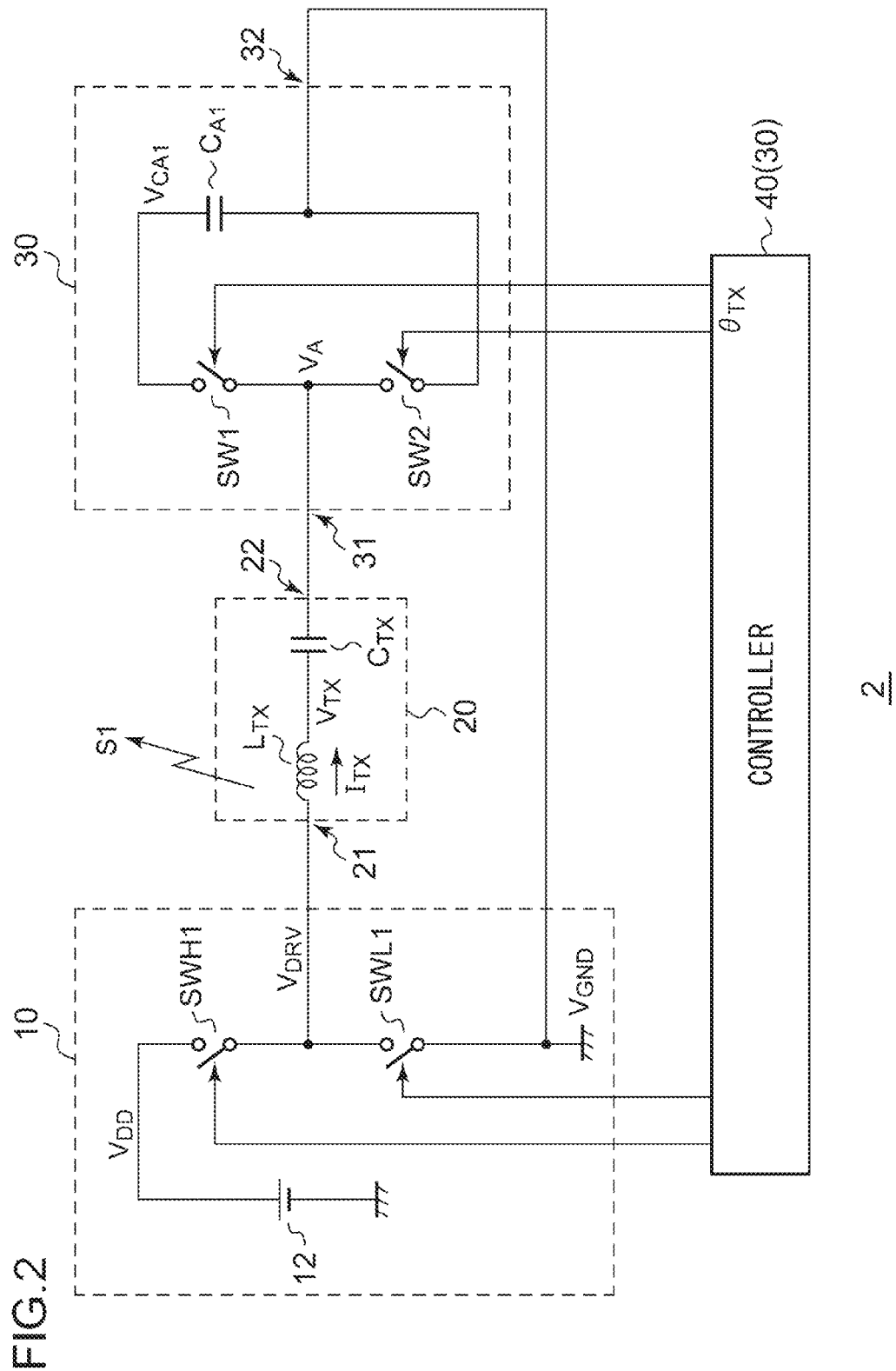
FIG. 2 is a circuit diagram showing a configuration of a wireless power transmitting apparatus according to a first embodiment.

FIG. 2 is a circuit diagram showing a configuration of a wireless power transmitting apparatus 2 according to a first embodiment. The wireless power transmitting apparatus 2 transmits an electric power signal S1 to a wireless power receiving apparatus (not shown). As such an electric power signal S1, the wireless power transmitting apparatus 2 uses the near-field components (electric field, magnetic field, or electromagnetic field) of electromagnetic waves that have not yet become radio waves.

The wireless power transmitting apparatus 2 includes a power supply 10, a transmission antenna 20, an automatic tuning assist circuit 30, and a first controller 40.

The transmission antenna 20 includes a transmission coil $L_{TX}$ arranged between its first terminal 21 and its second terminal 22. A resonance capacitor $C_{TX}$ is arranged in series with the transmission coil $L_{TX}$. The resonance capacitor $C_{TX}$ and the transmission coil $L_{TX}$ may also be mutually exchanged.

The automatic tuning assist circuit 30 is coupled in series with the transmission antenna 20. The power supply 10 is applies an AC driving voltage $V_{DRV}$ having a predetermined transmission frequency $f_{TX}$ across a series circuit that comprises the transmission antenna 20 and the automatic tuning assist circuit 30. The driving voltage $V_{DRV}$ may have a desired AC waveform, examples of which include a rectangular waveform, a trapezoidal waveform, a sine waveform, and the like. With the present embodiment, the driving voltage $V_{DRV}$ is configured as a rectangular wave signal which swings between a first voltage level (power supply voltage $V_{DD}$) and a second voltage level (ground voltage $V_{GND}$=0 V).

The power supply 10 includes a DC power supply 12, a first high-side switch SWH1, and a first low-side switch SWL1. The DC power supply 12 generates a DC power supply voltage $V_{DD}$. The first high-side switch SWH1 and the first low-side switch SWL1 are sequentially connected in series between the output terminal of the DC power supply 12 and a fixed voltage terminal (ground terminal). The first controller 40 switches on and off the first high-side switch SWH1 and the first low-side switch SWL1 in a complementary manner, with a transmission frequency $f_{TX}$.

The automatic tuning assist circuit 30 includes a first terminal 31, a second terminal 32, a first switch SW1, a second switch SW2, and a first auxiliary capacitor $C_{A1}$.

The first switch SW1 and the first auxiliary capacitor $C_{A1}$ are arranged in series between the first terminal 31 and the second terminal 32. The first switch SW1 and the first auxiliary capacitor $C_{A1}$ may also be mutually exchanged. The second switch SW2 is arranged in parallel with the first switch SW1 and the first auxiliary capacitor $C_{A1}$ between the first terminal 31 and the second terminal 32. The first auxiliary capacitor $C_{A1}$ is preferably configured to have a sufficiently greater capacitance than that of the resonance capacitor $C_{TX}$.

The first controller 40 switches on and off the first switch SW1 and the second switch SW2 in a complementary manner, with the same frequency $f_{TX}$ as that of the driving voltage $V_{DRV}$, and with a predetermined phase difference $\theta_{TX}$ with respect to the driving voltage $V_{DRV}$. The phase difference $\theta_{TX}$ may preferably be set to a value in the vicinity of +90 degrees or otherwise −90 degrees (270 degrees). That is to say, a part of the first controller 40 functions as a component of the automatic tuning assist circuit 30.

Figure 3A:
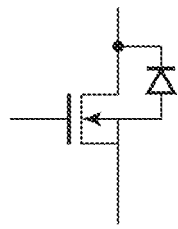
FIGS. 3A through 3F are diagrams each showing an example configuration of a switch employing MOSFETs.
Figure 3B:
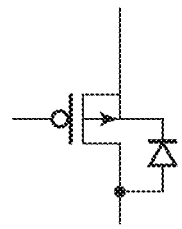
Figure 3C:
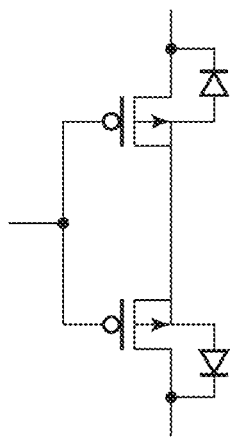
Figure 3D:
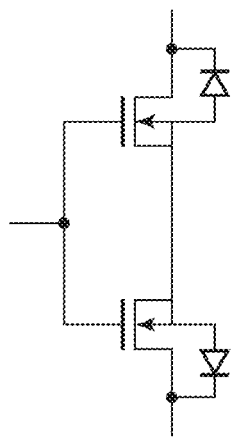
Figure 3E:
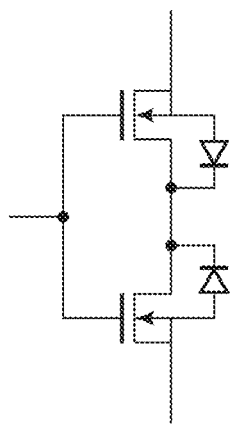
Figure 3F:
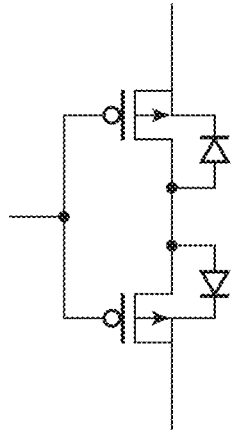

The first switch SW1 and the second switch SW2 are each configured employing a MOSFET (Metal Oxide Semiconductor Field Effect Transistor), IGBT (Insulated Gate Bipolar Transistor), bipolar transistor, or the like. FIGS. 3A and 3B are diagrams each showing an example configuration of a switch employing a MOSFET.

FIG. 3A shows a configuration of the switch employing an N-channel MOSFET. FIG. 3B shows a configuration of the switch employing a P-channel MOSFET. In a case in which the back gate of the MOSFET is connected to its source, the body diode that forms between the back gate and the drain is in the connection state regardless of the gate voltage. Thus, such a switch configured as a single MOSFET is not capable of blocking a current that flows in one particular direction. In the present specification, such a switch will be referred to as a "uni-directional switch".

The switches shown in FIGS. 3C through 3F each comprise two N-channel MOSFETs or otherwise two P-channel MOSFETs connected such that their body diodes are connected in reverse directions (back-to-back connection). With the switches shown in FIGS. 3C through 3F, in the off state, no current flows in either direction. In the present specification, such a switch will be referred to as a "bi-directional switch".

With the present embodiment, the switches SW1 and SW2 may each be configured as a uni-directional switch or otherwise a bi-directional switch. It should be noted that, in a case in which the switches SW1 and SW2 are each configured as a uni-directional switch, there is a need to pay attention to their switching phases. Detailed description thereof will be made later.

The above is the configuration of the wireless power transmitting apparatus 2. Next, description will be made regarding the operation thereof.

Let us consider an arrangement in which the switches SW1 and SW2 are each configured as a bi-directional switch which is capable of blocking a current in both directions in the off state.

FIG. 4 shows waveform diagrams each showing the operation of the wireless power transmitting apparatus 2 shown in FIG. 2. FIG. 4 shows, in the following order beginning from the top, the voltage at the first high-side switch SWH1, the voltage at the first low-side switch SWL1, the driving voltage $V_{DRV}$, the voltage at the first switch SW1, the voltage at the second switch SW2, the voltage $V_{CA1}$ at the first auxiliary capacitor $C_{A1}$, the voltage $V_A$ at the first terminal 31, the resonance current $I_{TX}$ that flows through the transmission antenna 20, and the resonance voltage $V_{TX}$ that develops across a series circuit including the transmission coil $L_{TX}$ and the resonance capacitor $C_{TX}$. In the waveform diagram for each switch, the high level represents the on state, and the low level represents the off state. It should be noted that FIG. 4 shows the waveforms of the resonance current $I_{TX}$ and the resonance voltage $V_{TX}$ obtained after a sufficient time has elapsed after the automatic tuning assist circuit 30 starts to operate.

As shown in FIG. 4, by switching on and off the first high-side switch SWH1 and the first low-side switch SWL1 in a complementary manner, such an arrangement is capable of generating the driving voltage $V_{DRV}$ having a rectangular waveform. The driving voltage $V_{DRV}$ thus generated is applied across a series circuit including the transmission antenna 20 and the automatic tuning assist circuit 30. The first controller 40 switches on and off the first switch SW1 and the second switch SW2 in a complementary manner, with the same frequency as that of the driving voltage $V_{DRV}$, and with a phase that is delayed by $\theta_{TX}$ (=90 degrees) with respect to the driving voltage $V_{DRV}$. The resonance current $I_{TX}$ flows to the first auxiliary capacitor $C_{A1}$ during the on time $T_{ON1}$ of the first switch SW1, and flows to the ground via the second switch SW2 during the on time $T_{ON2}$ of the second switch SW2. That is to say, the first auxiliary capacitor $C_{A1}$ is charged and discharged by means of the resonance current $I_{TX}$. As a result, the capacitor voltage $V_{CA1}$ develops at the first auxiliary capacitor $C_{A1}$.

Figure 5:
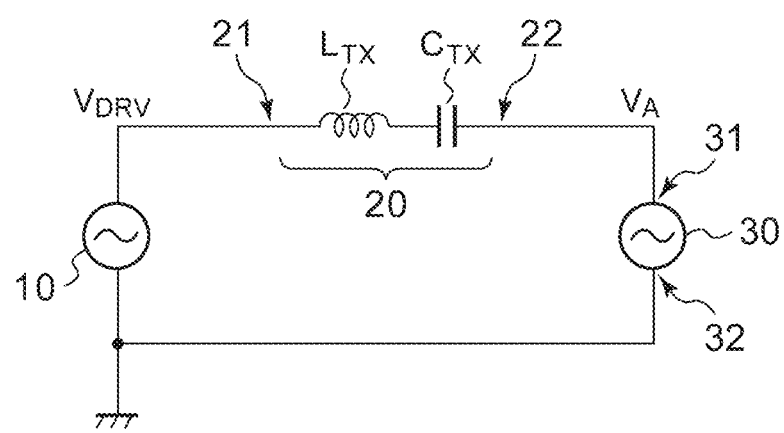
FIG. 5 is an equivalent circuit diagram of the wireless power transmitting apparatus shown in FIG. 2.

The automatic tuning assist circuit 30 applies a correction voltage $V_A$ to the second terminal 22 of the transmission antenna 20. During the on time $T_{ON1}$ of the first switch SW1, the first auxiliary capacitor voltage $V_{CA1}$ is used as the correction voltage $V_A$. On the other hand, during the on time $T_{ON2}$ of the second switch SW2, the ground voltage $V_{GND}$ is used as the correction voltage $V_A$. The automatic tuning assist circuit 30 can be regarded as a correction power supply configured to apply the correction voltage $V_A$ to the transmission antenna 20. FIG. 5 is an equivalent circuit diagram showing an equivalent circuit of the wireless power transmitting apparatus 2 shown in FIG. 2.

Figure 6A:
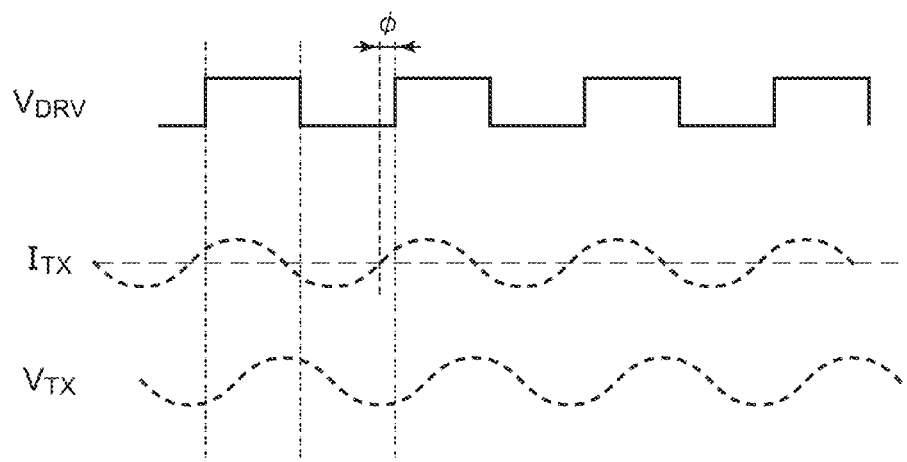
FIG. 6A is a waveform diagram showing a state in which an automatic tuning assist circuit does not operate.
Figure 6B:
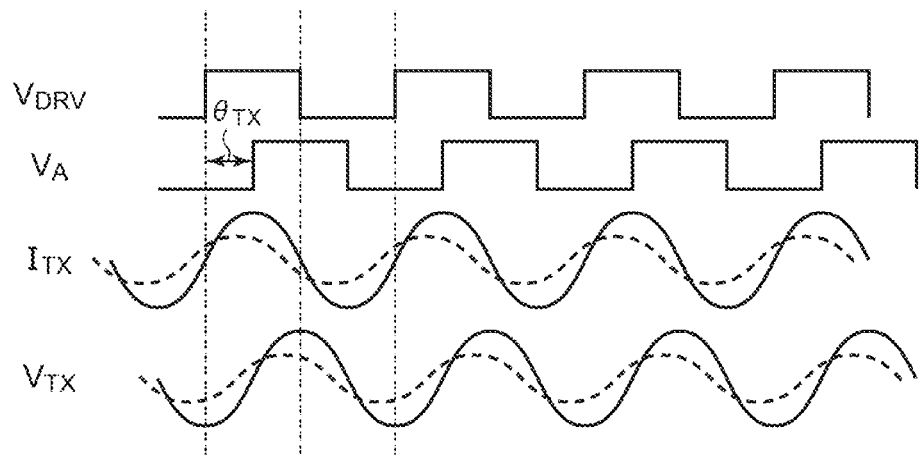
FIG. 6B is a waveform diagram showing a state in which the automatic tuning assist circuit operates.

FIG. 6A is a waveform diagram showing a state in which the automatic tuning assist circuit 30 does not operate, and FIG. 6B is a waveform diagram showing a state in which the automatic tuning assist circuit 30 operates.

First, description will be made with reference to FIG. 6A regarding the state in which the automatic tuning assist circuit 30 does not operate, i.e., a state in which the first switch SW1 is fixed to the off state, and the second switch SW2 is fixed to the on state. In this state, the correction voltage $V_A$ is fixed to the ground voltage $V_{GND}$.

The impedance Z of the transmission antenna 20 is represented by the following Expression (1). The resonance frequency $f_c$ of the transmission antenna 20 is represented by the following Expression (2). The following Expressions (1)

and (2) represent the impedance and the resonance frequency assuming that the resistance component is negligible. However, it is needless to say that, in actual circuits, the resistance component connected in series contributes to the circuit impedance.

$$Z = j\omega L_{TX} + 1/(j\omega C_{TX}) \quad (1)$$

$$f_c = 1/2\pi\sqrt{(L_{TX} \cdot C_{TX})} \quad (2)$$

In a case in which the frequency $f_{TX}$ of the driving voltage $V_{DRV}$ is higher than the resonance frequency $f_c$ ($f_{TX} > f_c$), the transmission antenna 20 functions as an inductor. In this case, the resonance current $I_{TX}$ that flows through the transmission antenna 20 has a phase which is delayed with respect to the phase of the driving voltage $V_{DRV}$. Conversely, in a case in which the frequency $f_{TX}$ of the driving voltage $V_{DRV}$ is lower than the resonance frequency $f_c$ ($f_{TX} < f_c$), the transmission antenna 20 functions as a capacitor. In this case, the resonance current $I_{TX}$ has a phase which is advanced with respect to the driving voltage $V_{DRV}$.

FIG. 6A shows a state in which $f_c > f_{TX}$. In this state, the resonance current $I_{TX}$ has a phase which is advanced by the phase difference $\phi$ with respect to the driving voltage $V_{DRV}$. It should be noted that the phase difference $\phi$ is not 90 degrees. This is because the resonance circuit includes a non-negligible resistance component (not shown) connected in series. In the non-resonant state, the impedance Z exhibits a high value, leading to a reduced amplitude of the resonance current $I_{TX}$. In this state, such an arrangement is not capable of transmitting a large amount of electric power.

Next, description will be made with reference to FIG. 6B regarding a case in which the automatic tuning assist circuit 30 operates.

In a case in which the automatic tuning assist circuit 30 operates, the correction voltage $V_A$ is applied to the transmission antenna 20 with a phase that is delayed by $\theta_{TX} = 90$ degrees with respect to the driving voltage $V_{DRV}$. As a result, phase matching is obtained between the resonance current $I_{TX}$ and the driving voltage $V_{DRV}$, thereby providing a quasi-resonant state. In this state, the resonance current $I_{TX}$ has a greater amplitude than that in the non-resonant state.

Figure 7:
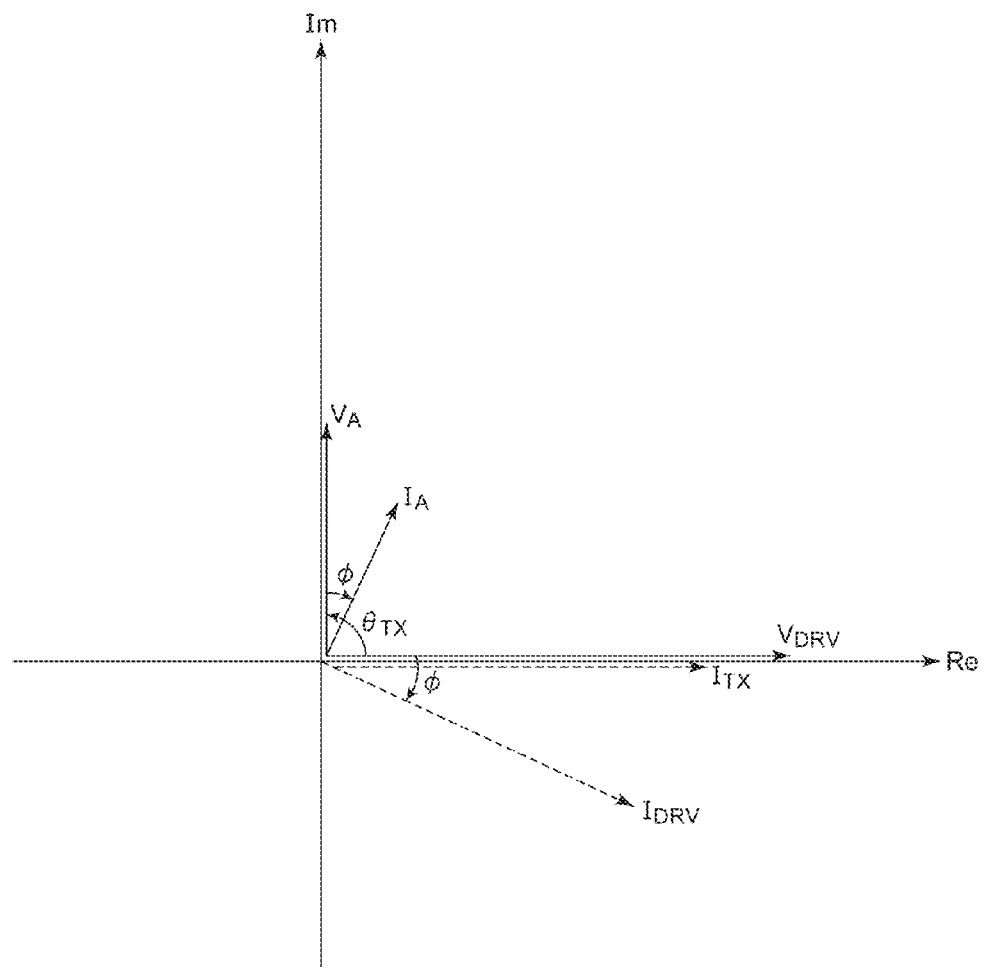
FIG. 7 is a phasor diagram for describing a quasi-resonant state provided by the automatic tuning assist circuit in a case in which $f_c < f_{TX}$.

FIG. 7 is a phasor diagram (vector diagram) for describing the quasi-resonant state provided by the automatic tuning assist circuit 30.

The phase of the driving voltage $V_{DRV}$ is 0 degrees. The phase of the correction voltage $V_A$ is $\theta_{TX} = 90$ degrees. In a case in which $f_c < f_{TX}$, the current has a phase that is delayed by the phase difference $\phi$ with respect to the voltage. Thus, the phase difference $\phi$ exists between the driving voltage $V_{DRV}$ and the current component $I_{DRV}$. Furthermore, the phase difference $\phi$ exists between the correction voltage $V_A$ and the current component $V_A$.

Based on the "principle of superposition", the resonance current $I_{TX}$ is configured as the sum of the current component $I_{DRV}$ induced by the driving voltage $V_{DRV}$ and the current component $I_A$ induced by the correction voltage $V_A$. There is a phase difference of $\theta_{TX}$ (=90 degrees) between the driving voltage $V_{DRV}$ and the correction voltage $V_A$. Accordingly, there is a phase difference of 90 degrees between the current components $I_{DRV}$ and $I_A$. Thus, by optimizing the amplitude of the correction voltage $V_A$, i.e., by optimizing the amplitude of the current component $I_A$, such an arrangement is capable of providing phase matching between the driving voltage $V_{DRV}$ (having a phase of 0 degrees) and a resultant current obtained by combining the two current components $I_{DRV}$ and $I_A$, i.e., the resonance current $I_{TX}$. That is to say, it can be clearly understood that such an arrangement provides a quasi-resonant state.

The wireless power transmitting apparatus 2 according to the embodiment is capable of automatically generating the correction voltage $V_A$ which provides the quasi-resonant state, which is an important excellent advantage of the wireless power transmitting apparatus 2 according to the embodiment.

Figure 8:
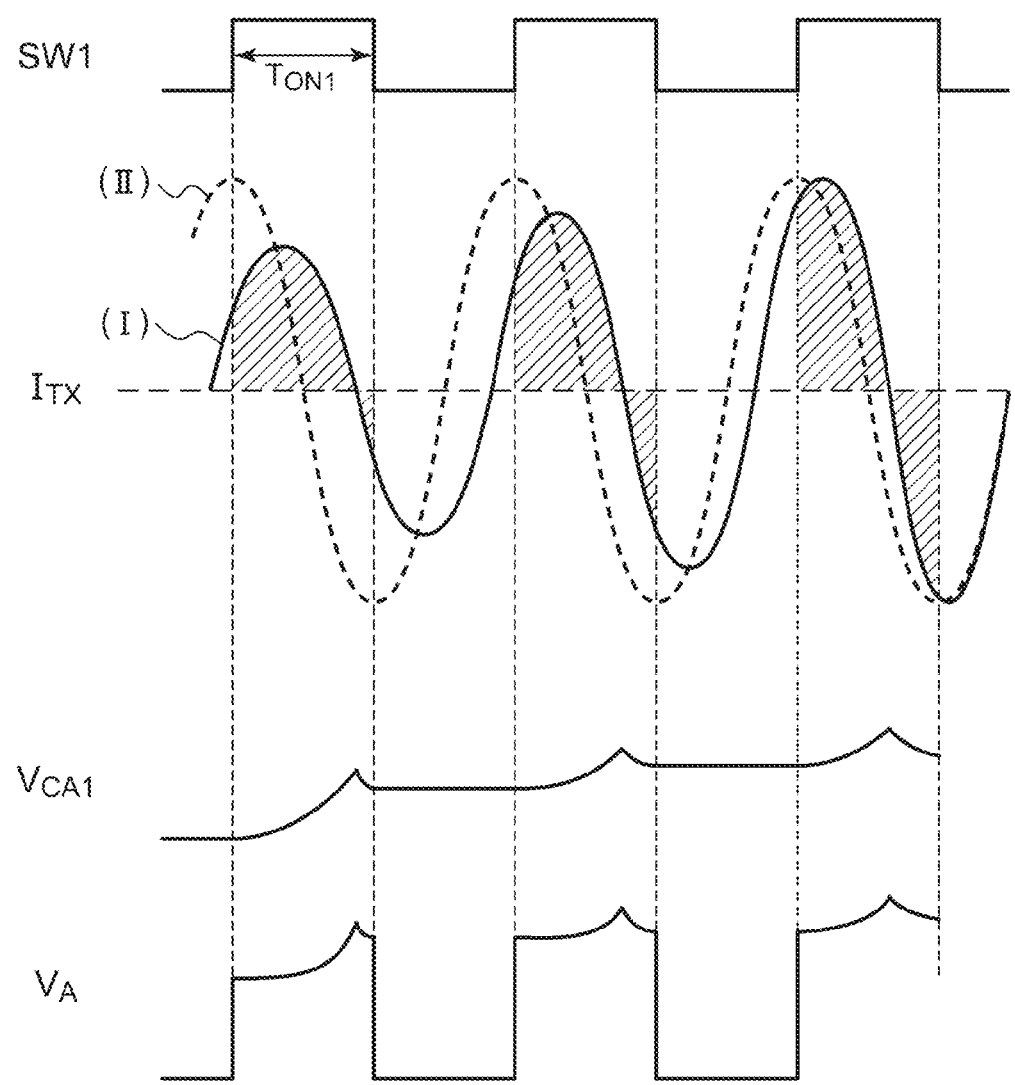
FIG. 8 is a diagram showing a resonance current in a non-resonant state and in a resonance state.

FIG. 8 is a diagram showing the resonance current $I_{TX}$ in the non-resonant state and in the resonance state. The waveform (I) represents the resonance current $I_{TX}$ in the non-resonant state. In the on time $T_{ON1}$ in which the switch SW1 is on, the first auxiliary capacitor $C_{A1}$ is charged and discharged by means of the resonance current $I_{TX}$. Specifically, the first auxiliary capacitor $C_{A1}$ is charged during a period in which the resonance current $I_{TX}$ is positive, and is discharged during a period in which the resonance current $I_{TX}$ is negative. As a result, in a case in which the period in which the resonance current $I_{TX}$ is positive is longer than the period in which the resonance current $I_{TX}$ is negative, the capacitor voltage $V_{CA1}$ rises. Otherwise, the capacitor voltage $V_{CA1}$ drops.

Let us say that the capacitor voltage $V_{CA1}$ rises in the on time $T_{ON1}$ of a certain cycle. In this case, the correction voltage $V_A$ is applied to the transmission antenna 20 according to the rising capacitor voltage $V_{CA1}$. This advances the phase of the resonance current $I_{TX}$ with respect to the resonance current $I_{TX}$ of the previous cycle. By repeatedly performing this processing, the capacitor voltage $V_{CA1}$ rises in increments of cycles, which gradually advances the phase of the resonance current $I_{TX}$. Eventually, the phase of the resonance current $I_{TX}$ shifts until it matches the phase of the driving voltage $V_{DRV}$ (resonance point). When the phase of the resonance current $I_{TX}$ exceeds the resonance point, the discharge current of the first auxiliary capacitor $C_{A1}$ becomes greater than its charging current, thereby providing a feedback control operation in the reverse direction. This reduces the capacitor voltage $V_{CA1}$, thereby returning the phase of the resonance current $I_{TX}$ to the resonance point. At the resonance point, such an arrangement provides a balance between the charging current and the discharging current of the first auxiliary capacitor $C_{A1}$ for each cycle, thereby providing an equilibrium state of the capacitor voltage $V_{CA1}$. In this state, a quasi-resonant state is maintained. As described above, with the wireless power transmitting apparatus 2 shown in FIG. 2, such an arrangement is capable of automatically generating the correction voltage $V_A$ that is required to provide the quasi-resonant state.

The above is the operation of the wireless power transmitting apparatus 2.

As described above, without adjusting the resonance frequency $f_c$ of the transmission antenna 20, the wireless power transmitting apparatus 2 is capable of automatically tuning the circuit state so as to provide the quasi-resonant state. In the wireless power transmission, the resonance frequency changes over time according to the position relation between the wireless power transmitting apparatus 2 and the wireless power receiving apparatus 4. The wireless power transmitting apparatus 2 is capable of following the change in the resonance frequency with high speed, thereby providing high-efficiency electric power transmission.

Furthermore, in a case in which a large amount of electric power is transmitted by means of wireless power transmission, a very high voltage develops between both ends of the resonance capacitor $C_{TX}$, which limits the use of a variable capacitor. With the wireless power transmitting apparatus 2, there is no need to adjust the capacitance of the resonance capacitor $C_{TX}$. Thus, such an arrangement does not require such a variable capacitor or the like, which is another advantage.

Description has been made above regarding a case in which the first switch SW1 is switched on and off with a phase that is delayed by $\theta_{TX}$ (=90 degrees) with respect to the phase of the switching of the first high-side switch SWH1. However, the phase difference $\theta_{TX}$ between the first switch SW1 and the first high-side switch SWH1 is not restricted to 90 degrees. Also, an arrangement may be made in which the phase difference $\theta_{TX}$ between the first switch SW1 and the first high-side switch SWH1 is set to 270 degrees (−90 degrees). In this case, the capacitor voltage $V_{CA1}$ is automatically adjusted such that it becomes a negative voltage.

That is to say, in a case in which $f_c < f_{TX}$, by setting the phase difference $\theta_{TX}$ to 90 degrees or otherwise 270 degrees, such an arrangement provides a quasi-resonant state.

Also, the phase difference $\theta_{TX}$ may be moved away from 90 degrees or 270 degrees. In this case, the phase difference $\theta_{TX}$ between the current components $I_{DRV}$ and $I_A$ does not match 90 degrees. However, even in such a case, the capacitor voltage $V_{CA1}$ is automatically adjusted such that the resultant resonance current $I_{TX}$ has a phase of 0 degrees. It should be noted that, as the phase difference $\theta_{TX}$ becomes closer to 90 degrees or otherwise 270 degrees, the required value of the amplitude of the current component $I_A$, i.e., the required absolute value of the capacitor voltage $V_{CA1}$, becomes smaller. This is an advantage in employing an arrangement in which the phase difference $\theta_{TX}$ is set to 90 degrees or otherwise 270 degrees.

It should be noted that, in a case in which $f_c < f_{TX}$, such an arrangement is capable of supporting the quasi-resonant state in which the phase difference $\theta_{TX}$ is set to 270 degrees only in a case in which the first switch SW1 and the second switch SW2 are each configured as a bi-directional switch. In other words, in a case in which the first switch SW1 and the second switch SW2 are each configured as a uni-directional switch, such an arrangement is not capable of supporting the quasi-resonant state in which the phase difference $\theta_{TX}$ is set to 270 degrees. This is because the current flows through the body diode. Thus, in a case in which the first switch SW1 and the second switch SW2 are each configured as a uni-directional switch, there is a need to switch on and off the first switch SW1 and the second switch SW2 with a phase such that no current flows through the body diodes which each function as an inversely conducting element.

The wireless power transmitting apparatus 2 automatically provides a quasi-resonant state not only in a case in which $f_c < f_{TX}$, but also in a case in which $f_c > f_{TX}$. In this case, the phase difference $\theta_{TX}$ is preferably set to 270 degrees (−90 degrees).

Figure 9:
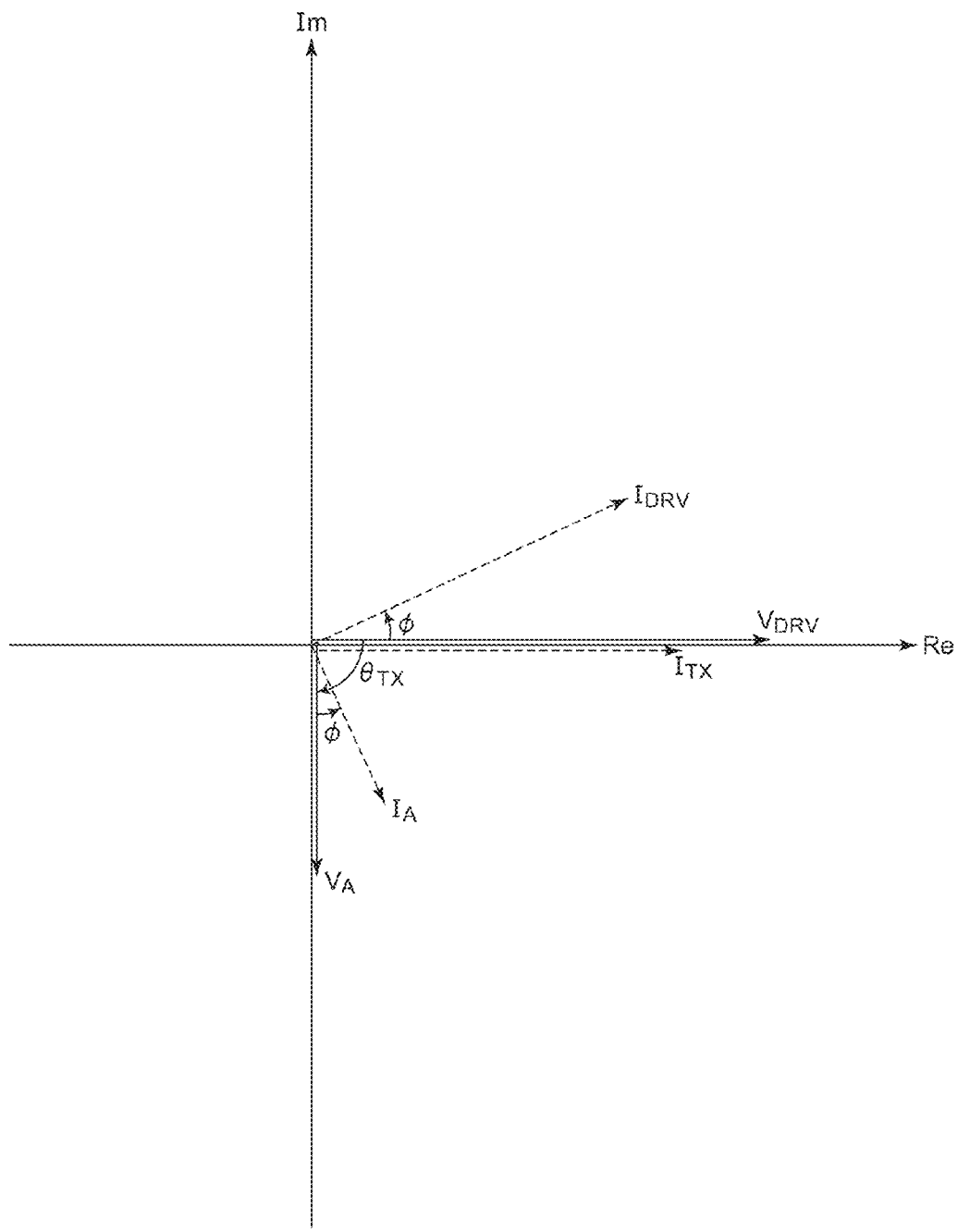
FIG. 9 is a phasor diagram for describing a quasi-resonant state provided by the automatic tuning assist circuit in a case in which $f_c > f_{TX}$.

FIG. 9 is a phasor diagram for describing a quasi-resonant state provided by the automatic tuning assist circuit 30 in a case in which $f_c > f_{TX}$. Description will be made below assuming that the driving voltage $V_{DRV}$ has a phase of 0 degrees, and the correction voltage $V_A$ has a phase $\theta_{TX}$ of 270 degrees (−90 degrees). In a case in which $f_c > f_{TX}$, the current has a phase which is advanced with respect to that of the voltage. Such an arrangement also provides a quasi-resonant state even in such a case.

It should be noted that, in a case in which $f_c > f_{TX}$, the phase difference $\theta_{TX}$ may be set to a value in the vicinity of 90 degrees. In this case, the capacitor voltage $V_{CA1}$ is automatically adjusted such that it becomes a negative voltage so as to provide a quasi-resonant state.

It should be noted that, in a case in which $f_c < f_{TX}$, such an arrangement is capable of supporting the quasi-resonant state in which the phase difference $\theta_{TX}$ is set to 90 degrees only in a case in which the first switch SW1 and the second switch SW2 are each configured as a bi-directional switch. In other words, in a case in which the first switch SW1 and the second switch SW2 are each configured as a uni-directional switch, such an arrangement is not capable of supporting the quasi-resonant state in which the phase difference $\theta_{TX}$ is set to 90 degrees. This is because the current flows through the body diode.

Next, description will be made regarding modifications of the wireless power transmitting apparatus 2. Each modification may be combined with any one of the other modifications, which is encompassed within the scope of the present invention.

Figure 10:
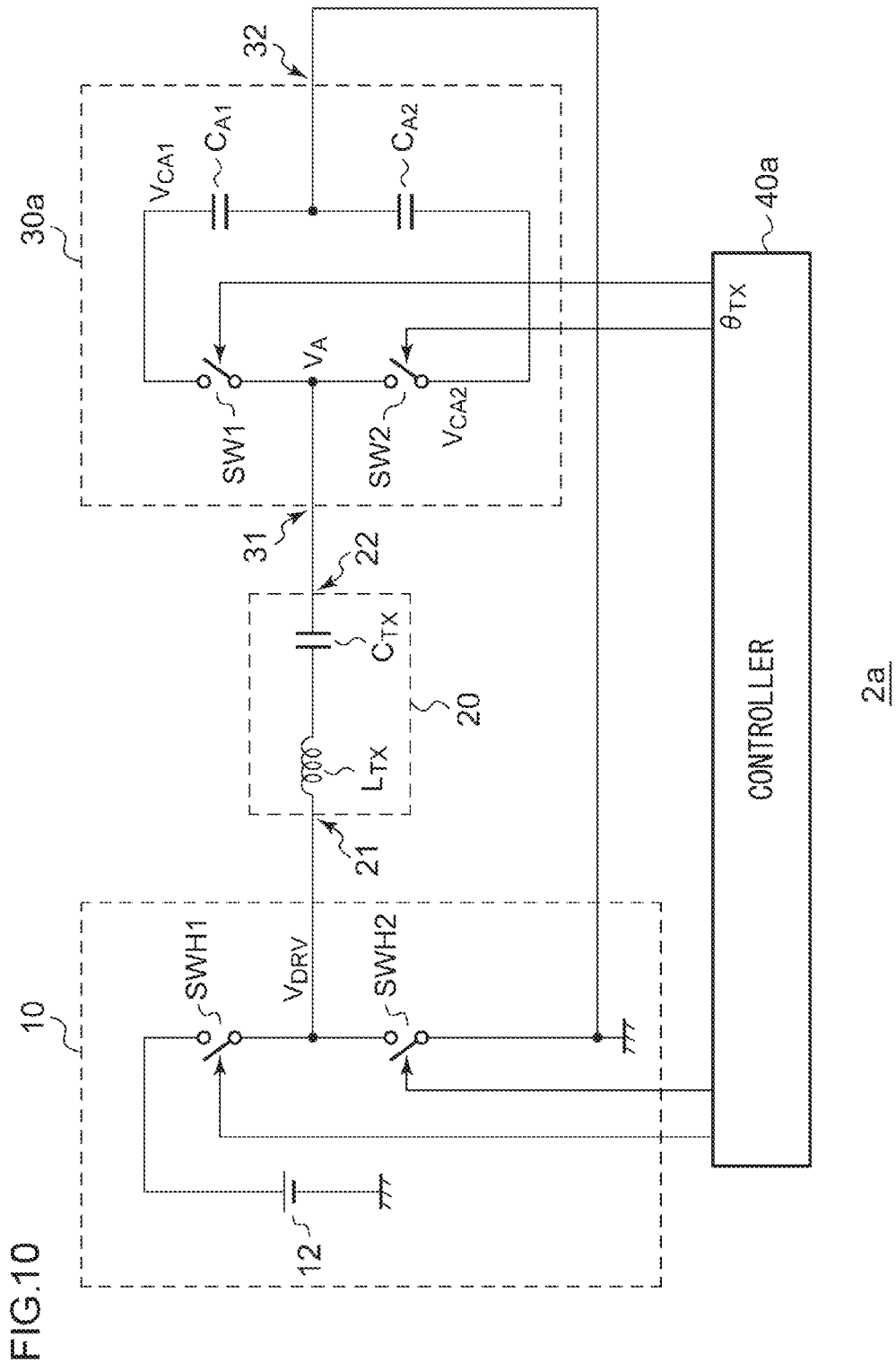
FIG. 10 is a circuit diagram showing a configuration of a wireless power transmitting apparatus according to a first modification.

FIG. 10 is a circuit diagram showing a configuration of a wireless power transmitting apparatus 2a according to a first modification. An automatic tuning assist circuit 30a includes a second auxiliary capacitor $C_{A2}$ between the first terminal 31 and the second terminal 32 such that it is connected in series with the second switch SW2.

With such a modification, during the on time $T_{ON1}$ of the first switch SW1, the correction voltage $V_A$ is set to the capacitor voltage $V_{CA1}$. During the on time $T_{ON2}$ of the second switch SW2, the correction voltage $V_A$ is set to the capacitor voltage $V_{CA2}$.

With the wireless power transmitting apparatus 2a, by optimizing the capacitor voltages $V_{CA1}$ and $V_{CA2}$, such an arrangement provides a quasi-resonant state both in the case in which $V_{TX} > f_c$ and in the case in which $V_{TX} < f_c$.

Figure 11:
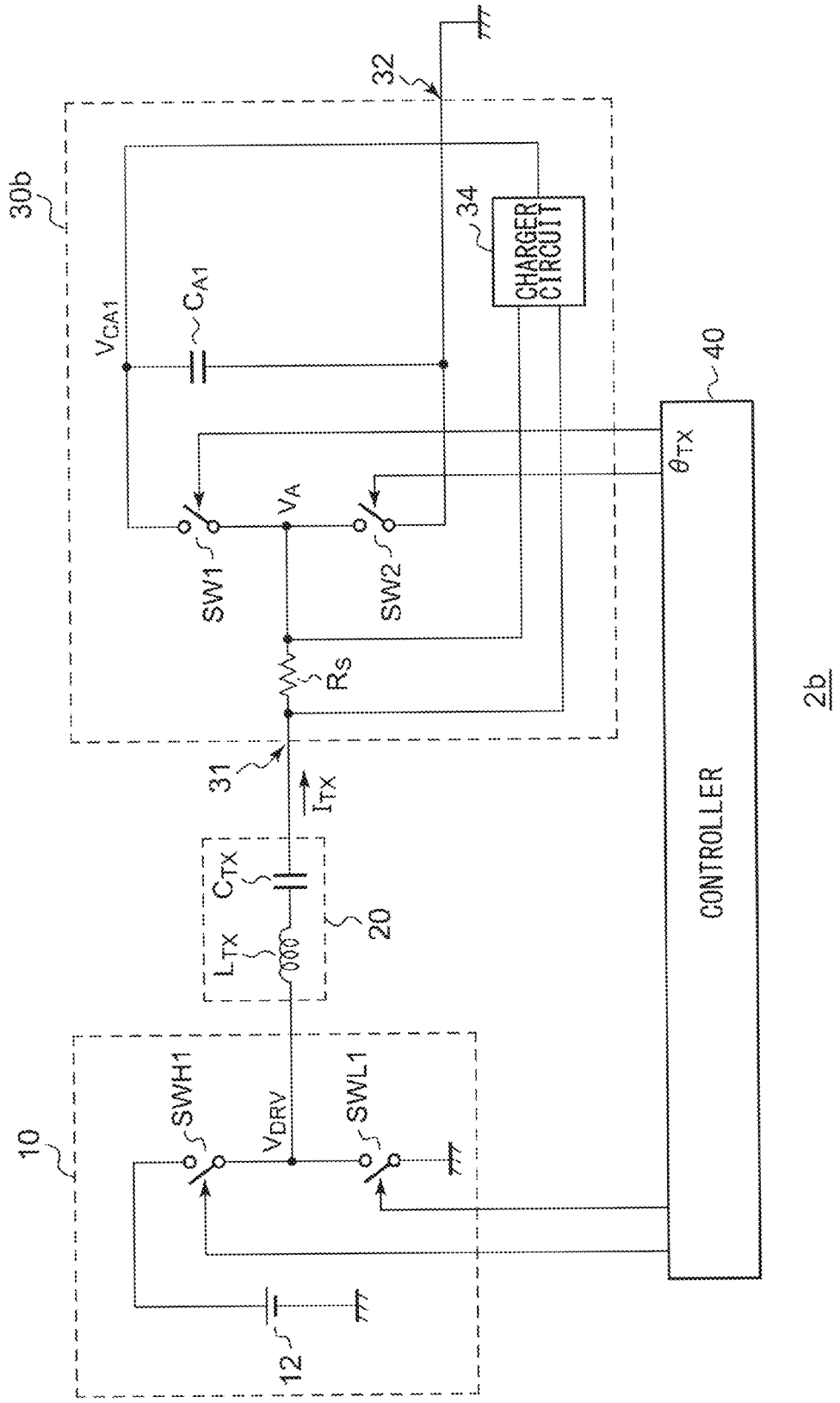
FIG. 11 is a circuit diagram showing a configuration of a wireless power transmitting apparatus according to a second modification.

FIG. 11 is a circuit diagram showing a configuration of a wireless power transmitting apparatus 2b according to a second modification. An automatic tuning assist circuit 30b includes a charger circuit 34 and a detection resistor Rs. The detection resistor Rs is arranged on a path of the resonance current $I_{TX}$. A detection voltage $V_S$ develops at the detection resistor Rs in proportion to the resonance current $I_{TX}$. The charger circuit 34 charges the first auxiliary capacitor $C_{A1}$ based on the detection voltage $V_S$ so as to provide a quasi-resonant state. As described above, the capacitor voltage $V_{CA1}$ automatically becomes the optimum level. In addition, by providing the charger circuit 34, such an arrangement provides a quasi-resonant state in a shorter period of time.

Figure 12:
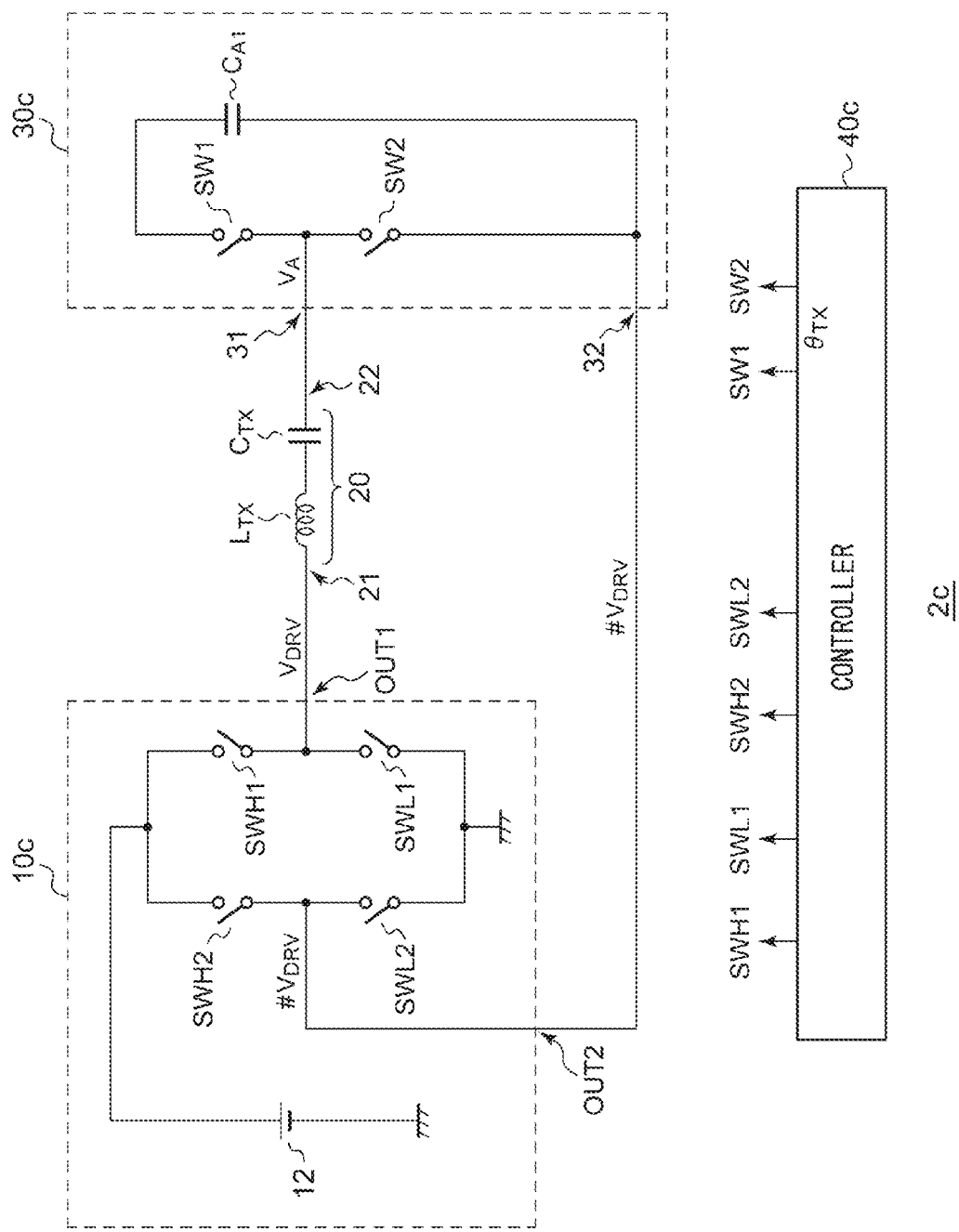
FIG. 12 is a circuit diagram showing a configuration of a wireless power transmitting apparatus according to a third modification.

FIG. 12 is a circuit diagram showing a configuration of a wireless power transmitting apparatus 2c according to a third modification. Description has been made in which the power supply is configured as a half-bridge circuit. In contrast, a power supply 10c shown in FIG. 12 is configured as an H-bridge circuit. A second high-side switch SWH2 and a second low-side switch SWL2 are sequentially connected in series between the output terminal of the power supply 12 and a fixed voltage terminal (ground terminal).

The first controller 40c repeatedly switches states between a state in which the pair of the high-side switch SWH1 and the second low-side switch SWL2 are turned on and a state in which the pair of the second high-side switch SWH2 and the first low-side switch SWL1 are turned on.

A driving voltage $V_{DRV}$ that develop at a connection node (first output terminal) OUT1 that connects the first high-side switch SWH1 and the first low-side switch SWL1 has a phase that is the reverse of the phase of a driving voltage #$V_{DRV}$ that develops at a connection node (second output terminal) OUT2 that connects the second high-side switch SWH2 and the second low-side switch SWL2. The transmission antenna 20 and an automatic tuning assist circuit 30c are coupled in series between the first output terminal OUT1 and the second output terminal OUT2.

With the wireless power transmitting apparatus 2c shown in FIG. 12, such an arrangement provides the same advantages as those provided by the wireless power transmitting apparatus described above.

Figure 13A:
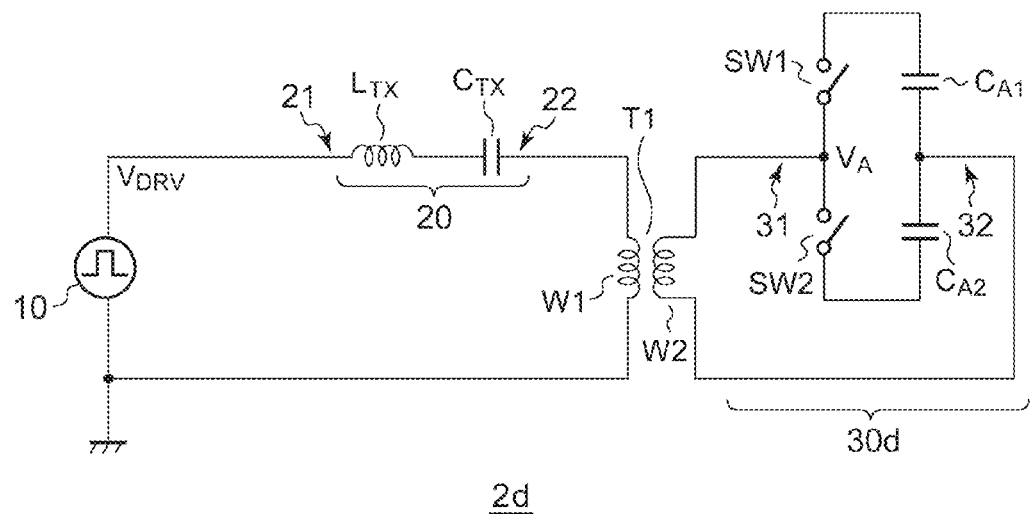
FIGS. 13A and 13B are circuit diagrams showing the configurations of wireless power transmitting apparatuses according to a fourth modification and a fifth modification, respectively.
Figure 13B:
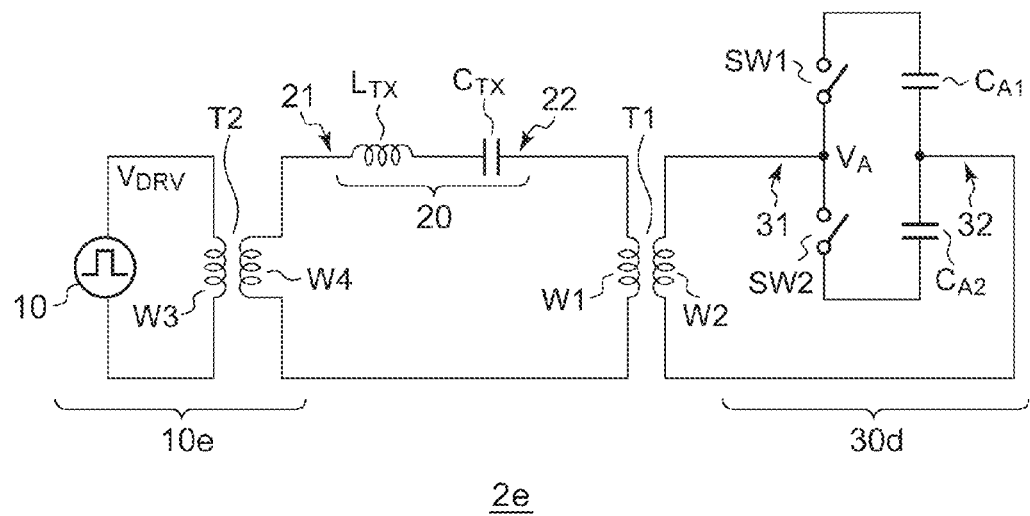

FIGS. 13A and 13B are circuit diagrams showing the configurations of wireless power transmitting apparatuses 2d and 2e according to a fourth modification and a fifth modification. The first controller 40 is omitted from the diagrams.

With the wireless power transmitting apparatus 2d shown in FIG. 13A, an automatic tuning assist circuit 30d is coupled in series with the transmission antenna 20 via a first transformer T1. Specifically, a secondary winding W2 of the first transformer T1 is arranged between the first terminal 31 and the second terminal 32, and a primary winding W2 of the first transformer T1 is arranged in series with the transmission antenna 20. The power supply 10 applies a driving voltage across a series circuit comprising the transmission antenna 20 and the primary winding W1.

With the wireless power transmitting apparatus 2d, energy is transmitted and received between the transmission antenna 20 and the automatic tuning assist circuit 30d via the transformer T1. Such an arrangement provides the same advantages as those provided by the wireless power transmitting apparatuses described above.

With an arrangement shown in FIG. 13B, the power supply 10 applies the driving voltage $V_{DRV}$ across a series circuit including the transmission antenna 20 and the automatic tuning assist circuit 30d via the second transformer T2. Specifically, the second winding W2 of the second transformer T2 is arranged in series with the transmission antenna 20. The power supply 10 applies the driving voltage $V_{DRV}$ between both ends of the primary winding W1 of the second transformer T2.

With the wireless power transmitting apparatus 2e, the driving voltage $V_{DRV}$ is applied across a series circuit including the transmission antenna 20 and the automatic tuning assist circuit 30d via the second transformer T2. Such an arrangement also provides the same advantages as those of the wireless power transmitting apparatuses described above. With the wireless power transmitting apparatus 2e, the first transformer T1 may be omitted. The power supply 10 shown in FIGS. 13A and 13B may be configured as an H-bridge circuit, a half-bridge circuit, or any other kind of power supply.

Wireless Power Receiving Apparatus

The automatic tuning assist circuit described above may also be employed in the wireless power receiving apparatus. Description will be made below regarding such a wireless power receiving apparatus.

Figure 14:
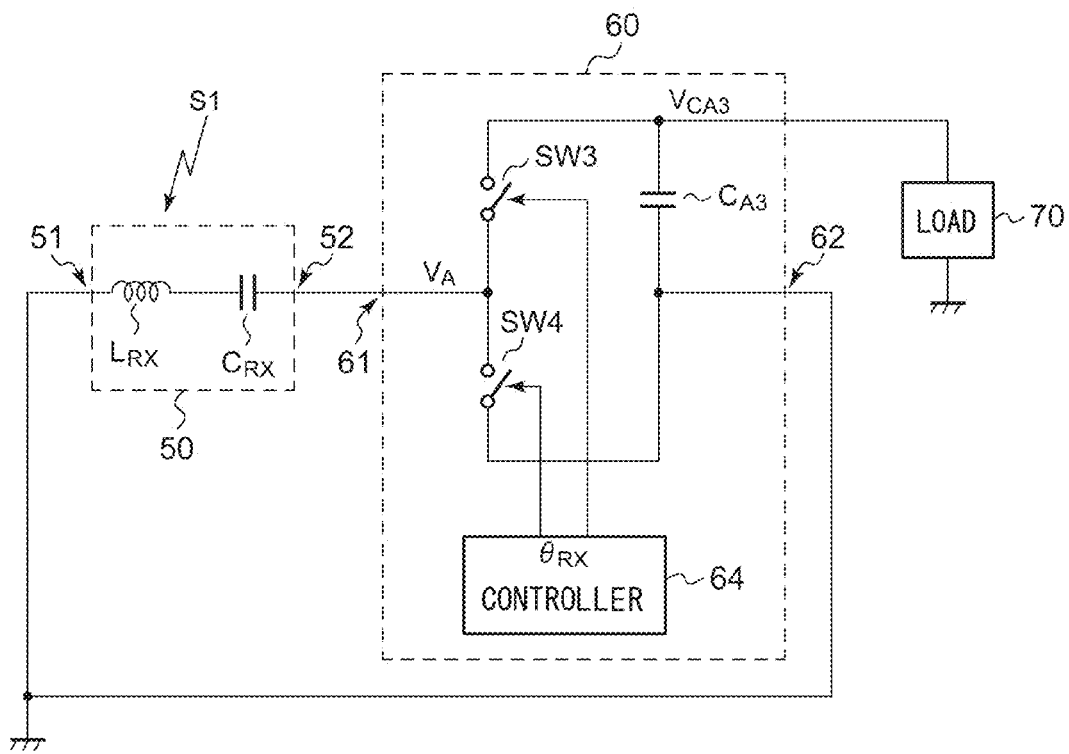
FIG. 14 is a circuit diagram showing a configuration of a wireless power receiving apparatus according to the first embodiment.

FIG. 14 is a circuit diagram showing a configuration of a wireless power receiving apparatus 4 according to the first embodiment. The wireless power receiving apparatus 4 receives the electric power signal S1 transmitted from the aforementioned wireless power transmitting apparatus or otherwise a wireless power transmitting apparatus having an entirely different configuration. The electric power signal S1 is configured using the near-field components (electric field, magnetic field, or electromagnetic field) of electromagnetic waves that have not yet become radio waves.

The wireless power receiving apparatus 4 includes a reception antenna 50, an automatic tuning assist circuit 60, and a load 70 to be supplied with electric power. The load 70 may include an unshown rectifier circuit, detector circuit, or the like, as a built-in component.

The reception antenna 50 includes a reception coil $L_{RX}$ and a resonance capacitor $C_{RX}$ arranged in series between a first terminal 51 and a second terminal 52.

The automatic tuning assist circuit 60 has the same configuration as that of the automatic tuning assist circuit 30 described above. Specifically, a third switch SW3 and a third auxiliary capacitor $C_{A3}$ are arranged between a first terminal 61 and a second terminal 62. Furthermore, a fourth switch SW4 is arranged between the first terminal 61 and the second terminal 62 such that it is connected in parallel with the third switch SW3 and the third auxiliary capacitor $C_{A3}$.

The second controller 64 switches on and off the third switch SW3 and the fourth switch SW4 in a complementary manner, with the same frequency as that of the electric power signal S1 and with a phase difference $\theta_{RX}$ with respect to the driving voltage ($V_{DRV}$) which is applied to the transmitter-side antenna. For example, the phase difference $\theta_{RX}$ is set to 180 degrees or otherwise 0 degrees.

The automatic tuning assist circuit 60 is coupled in series with the reception antenna 50. Furthermore, the load 70 to be supplied with electric power is connected to the third auxiliary capacitor $C_{A3}$.

Figure 15:
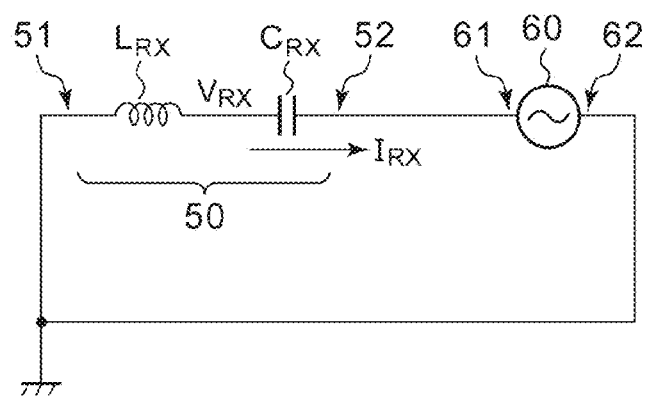
FIG. 15 is an equivalent circuit diagram of the wireless power transmitting apparatus shown in FIG. 14.

The above is the configuration of the wireless power receiving apparatus 4. Next, description will be made regarding the operation thereof. FIG. 15 is an equivalent circuit diagram showing an equivalent circuit configuration of the wireless power receiving apparatus 4 shown in FIG. 14. As with the automatic tuning assist circuit 30 of the wireless power transmitting apparatus 2, the automatic tuning assist circuit 60 can be regarded as a correction power supply configured to apply a correction voltage $V_A$ to the reception antenna 50. During the on time $T_{ON3}$ in which the third switch SW3 is turned on, the correction voltage $V_A$ is set to the voltage $V_{cA3}$ that develops at the third auxiliary capacitor $C_{A3}$. During the on time $T_{ON4}$ of the fourth switch SW4, the correction voltage $V_A$ is set to the ground voltage.

Figure 16:
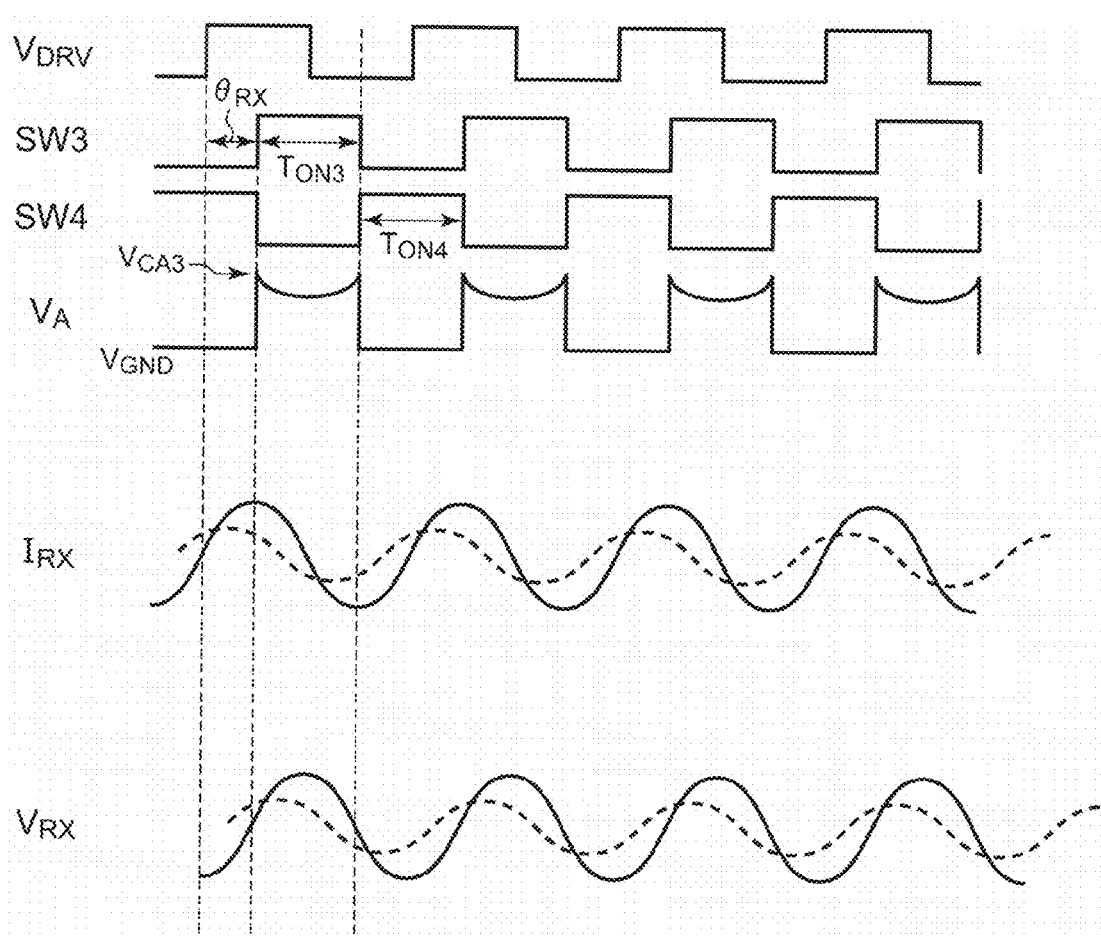
FIG. 16 is a waveform diagram showing the operation of the wireless power receiving apparatus shown in FIG. 14.

FIG. 16 is a waveform diagram showing the operation of the wireless power receiving apparatus 4 shown in FIG. 14. FIG. 16 shows, in the following order beginning from the top, the voltages applied to the third switch SW3 and the fourth switch SW4, the correction voltage $V_A$, the resonance current $I_{RX}$ that flows through the reception antenna 50, and the resonance voltage $V_{RX}$ that develops across a series circuit including the reception coil $L_{RX}$ and the resonance capacitor $C_{RX}$. In the waveform diagrams showing the voltages applied to the respective switches, the high-level state represents the on state, and the low-level state represents the off state. In the waveform diagrams showing the resonance current $I_{RX}$ and the resonance voltage $V_{RX}$, the solid line represents the waveform of a steady state (quasi-resonant state) after a sufficient period of time elapses after the automatic tuning assist circuit 60 starts to operate, and the broken line represents the waveform of a non-resonant state when the automatic tuning assist circuit 60 does not operate.

By switching on and off the third switch SW3 and the fourth switch SW4 in a complementary manner, with a phase $\theta_{RX}$ which is shifted by 180 degrees or otherwise 0 degrees with respect to the driving voltage $V_{DRV}$ of the wireless power transmitting apparatus side, such an arrangement charges or otherwise discharges the third auxiliary capacitor $C_{A3}$. Furthermore, by applying the correction voltage $V_A$ to the reception antenna 50, such an arrangement allows the resonance current $I_A$ to have a phase matching the phase of the driving voltage $V_{DRV}$ of the transmission side, thereby providing a quasi-resonant state.

In order to provide a quasi-resonant state, there is a need to switch on and off the third switch SW3 and the fourth switch SW4 with a suitable frequency $f_{TX}$ and with a suitable phase $\theta_{RX}$. In order to meet this requirement, the wireless power transmitting apparatus 2 may be configured to transmit the data which represents the frequency $f_{TX}$ and the phase $\theta_{RX}$ to the wireless power receiving apparatus 4. Also, the wireless power receiving apparatus 4 may be configured to sweep the phase $\theta_{RX}$ so as to detect the optimum phase $\theta_{RX}$.

The above is the operation of the wireless power receiving apparatus 4.

As described above, with the wireless power receiving apparatus 4 shown in FIG. 14, such an arrangement automatically provides a resonant state without a need to adjust the capacitance of the resonance capacitor $C_{RX}$.

Next, description will be made regarding modifications of the wireless power receiving apparatus 4.

Figure 17A:
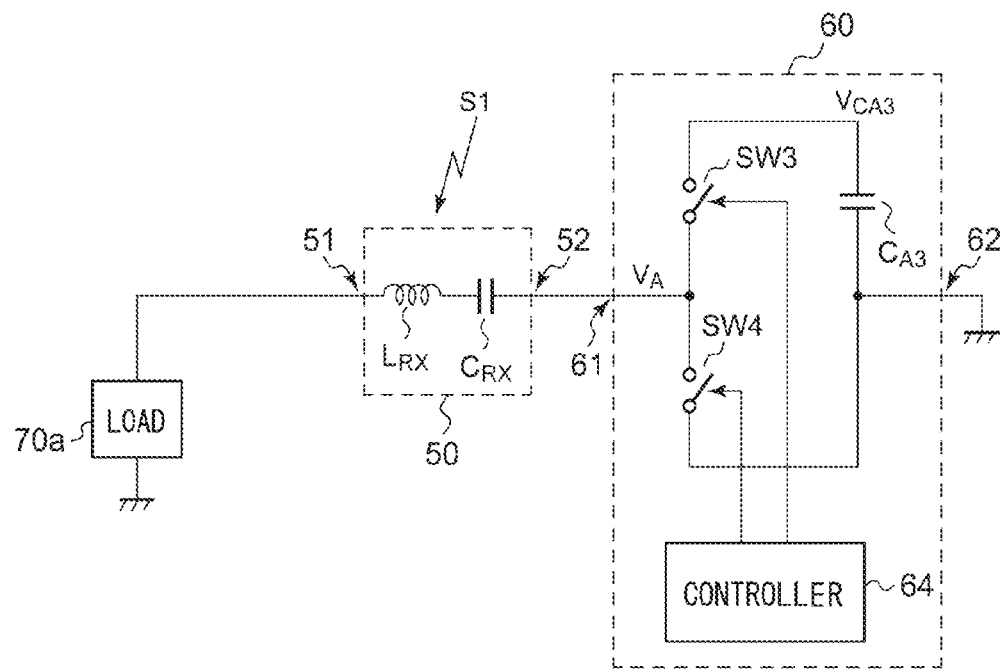
FIGS. 17A and 17B are circuit diagrams showing the configurations of wireless power receiving apparatuses according to a first modification and a second modification.
Figure 17B:
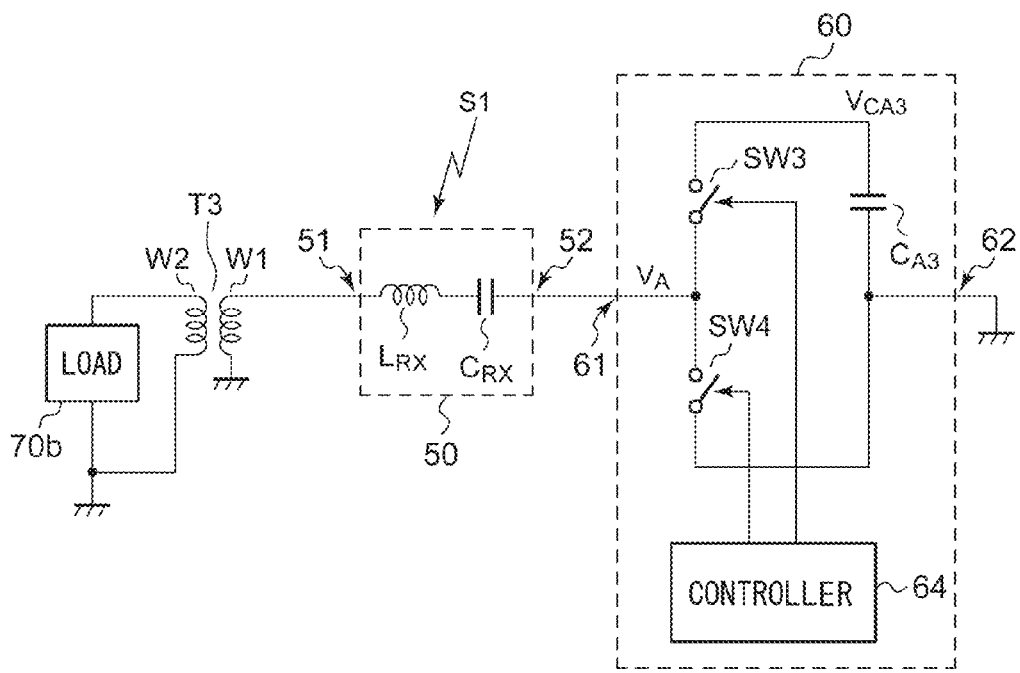

Description has been made with reference to FIG. 14 regarding an arrangement in which the load 70 is connected to the third auxiliary capacitor $C_{A3}$. Also, the load 70 may be connected to a different position. FIGS. 17A and 17B are circuit diagrams showing the configurations of wireless power receiving apparatuses according to a first modification and a second modification. With a wireless power receiving apparatus 4a shown in FIG. 17A, a load 70a is arranged in series with the reception antenna 50 and the automatic tuning assist circuit 60. Specifically, the load 70a is connected to a first terminal 51 of the reception antenna 50.

A wireless power reception apparatus 4b shown in FIG. 17B includes a third transformer T3 by means of which a load 70b is insulated from the reception antenna 50. The primary winding W1 of the third transformer T3 is connected in series with the reception antenna 50. The load 70b is connected to the secondary winding W2 of the third transformer T3.

In a case in which the load is connected in series with the reception antenna 50 as shown in FIGS. 17A and 17B, and in a case in which the load has a low impedance, such an arrangement has an advantage of a certain level of acquisition of electric power even without the adjustment by means of the automatic tuning assist circuit 60. However, such an arrangement has a disadvantage of a reduction of the Q-value of the reception antenna 50 due to the resistance component of the load. Thus, it is difficult for such an arrangement to acquire a large amount of electric power.

Conversely, in a case in which electric power is acquired from the automatic tuning assist circuit 60 as shown in FIG. 4, the Q-value of the reception antenna 50 is not reduced due to the load 70. Thus, such an arrangement is capable of acquiring a large amount of electric power even in a case in which the load 70 has a high impedance. However, in a case in which the load 70 has a very low impedance, such an arrangement has a problem of a reduction in the efficiency of the operation of the automatic tuning assist circuit 60.

Thus, the position of the load in the circuit is preferably determined giving consideration to the electric power to be transmitted, the impedance of the load, and so forth.

Figure 18:
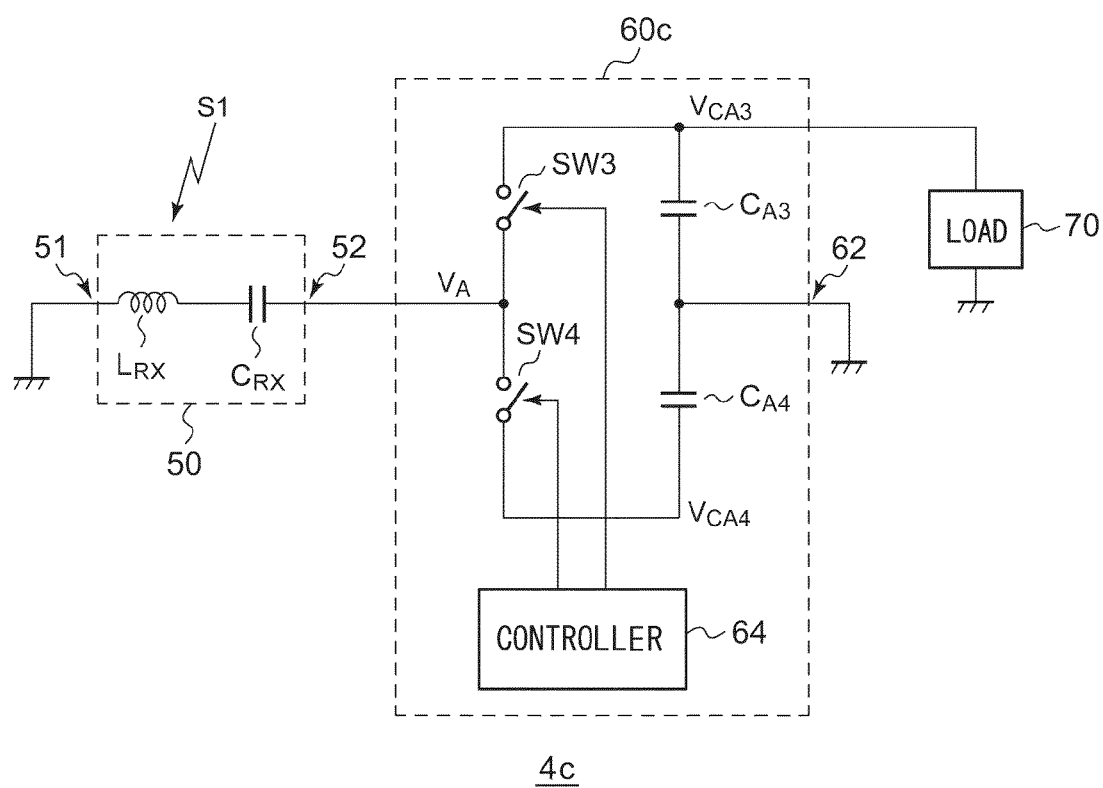
FIG. 18 is a circuit diagram showing a configuration of a wireless power receiving apparatus according to a third modification.

FIG. 18 is a circuit diagram showing a configuration of a wireless power receiving apparatus 4c according to a third modification. An automatic tuning assist circuit 60c further includes a fourth auxiliary capacitor $C_{A4}$ between the first terminal 61 and the second terminal 62 such that it is connected in series with the fourth switch SW4. The position of the load 70 is not restricted in particular.

With such a modification, during the on time $T_{ON3}$ of the third switch SW3, the correction voltage $V_A$ is set to the capacitor voltage $V_{CA3}$, and during the on time $T_{ON4}$ of the fourth switch SW4, the correction voltage $V_A$ is set to the capacitor voltage $V_{CA4}$. With the wireless power receiving apparatus 4c, the capacitor voltages $V_{CA1}$ and $V_{CA2}$ can be optimized so as to provide a quasi-resonant state in both the state in which $f_{TX} > f_c$ and the state in which $f_{TX} < f_c$.

With such a wireless power receiving apparatus, the third switch SW3 and the fourth switch SW4 may each be configured as a uni-directional switch or otherwise a bi-directional switch. In a case in which the third switch SW3 and the fourth switch SW4 are each configured as a uni-directional switch, there is a need to switch on and off the third switch SW3 and the fourth switch SW4 with a phase such that no current flows through each of the inversely conducting elements.

Figure 19A:
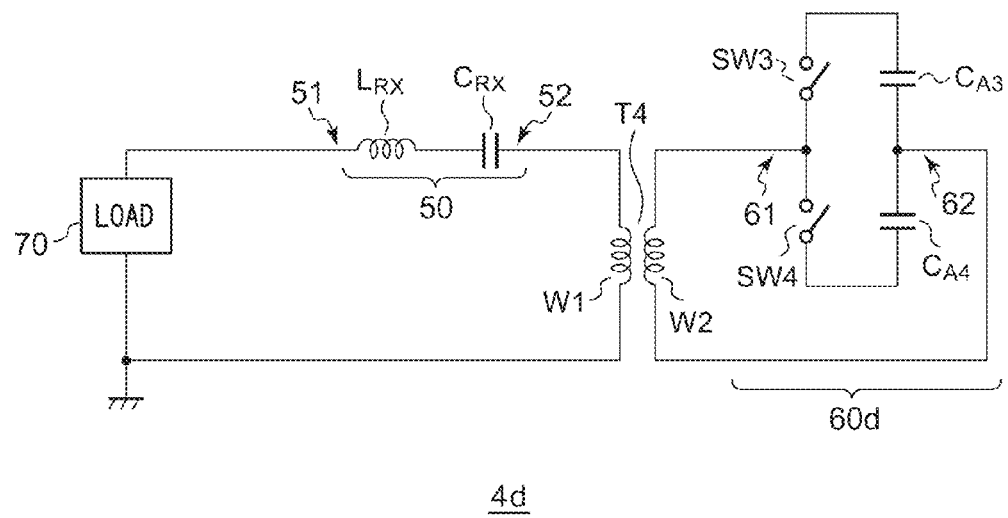
FIGS. 19A and 19B are circuit diagrams showing the configurations of wireless power receiving apparatuses according to a fourth modification and a fifth modification, respectively.
Figure 19B:
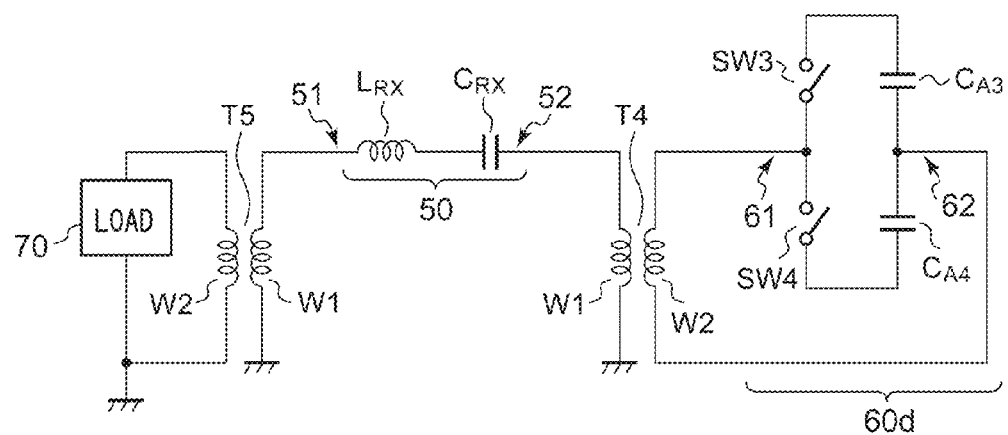

FIGS. 19A and 19B are circuit diagrams showing the configurations of wireless power receiving apparatuses according to a fourth modification and a fifth modification, respectively. The second controller 64 is omitted from the diagrams.

With a wireless power receiving apparatus 4d shown in FIG. 19A, an automatic tuning assist circuit 60d is coupled in series with the reception antenna 50 via a fourth transformer T4. Specifically, the secondary winding W2 of the fourth transformer T4 is arranged between the first terminal 61 and the second terminal 62. The primary winding W1 of the fourth transformer T4 is arranged in series with the reception antenna 50.

With the wireless power receiving apparatus 4d, energy is transmitted and received between the reception antenna 50 and the automatic tuning assist circuit 60d via the fourth transformer T4. Such an arrangement provides the same advantages as those provided by the wireless power receiving apparatuses described above.

FIG. 19B shows an arrangement in which the load 70 is coupled with the reception antenna 50 and the automatic tuning assist circuit 60d via a fifth transformer T5. Specifically, the primary winding W1 of the fifth transformer T5 is connected in series with the reception antenna 50. The load 70 is connected between both ends of the secondary winding W2 of the fifth transformer T5.

Such an arrangement also provides the same advantages as those provided by the wireless power receiving apparatuses described above. With such a wireless power receiving apparatus 4e, the fourth transformer T4 may be omitted. With such an arrangement shown in FIG. 19A, the load 70 may be coupled with the third auxiliary capacitor $C_{A3}$. Also, with such an arrangement shown in FIG. 19B, the load 70 may be coupled with the third capacitor $C_{A3}$ via a fifth transformer T5.

Wireless Power Supply System

By combining the wireless power transmitting apparatus and the wireless power receiving apparatus described above, such an arrangement provides a wireless power supply system.

Figure 20:
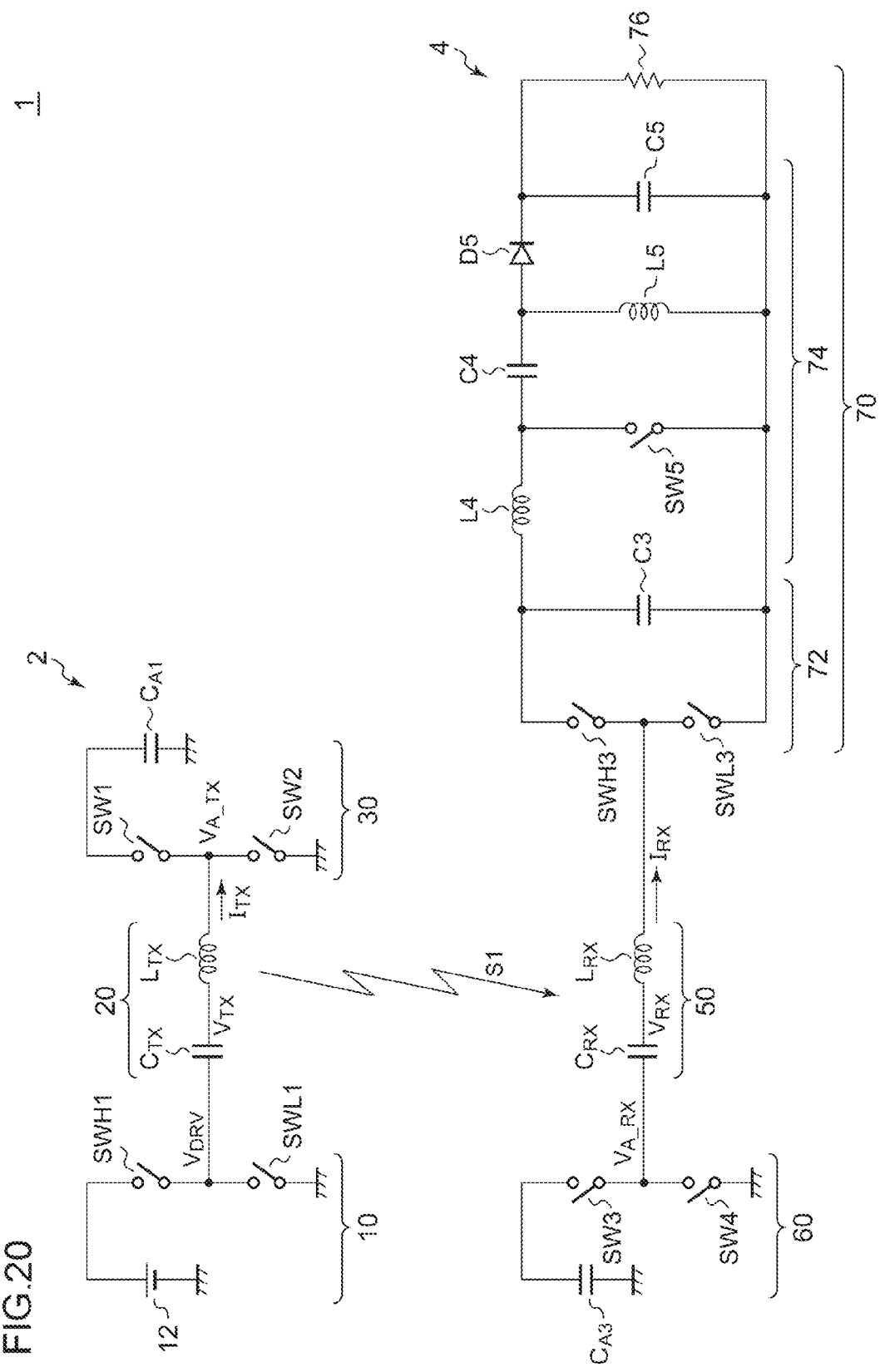
FIG. 20 is a circuit diagram showing an example configuration of a wireless power supply system according to the first embodiment.

FIG. 20 is a circuit diagram showing an example configuration of a wireless power supply system according to the first embodiment. The wireless power supply system 1 includes the wireless power transmitting apparatus 2 and the wireless power receiving apparatus 4.

The load 70 includes a rectifier circuit 72 and a switching regulator 74, in addition to a load circuit 76. The rectifier circuit 72 is configured as a synchronous detector circuit, and includes a smoothing capacitor C3, a third high-side switch SWH3, and a third low-side switch SWL3.

The switching regulator 74 is configured as a step-up converter, and controlled so as to be capable of supplying the load circuit 76 with the maximum electric power. The configuration and the operation of the switching regulator 74 are known, and accordingly, description thereof will be omitted.

Figure 21:
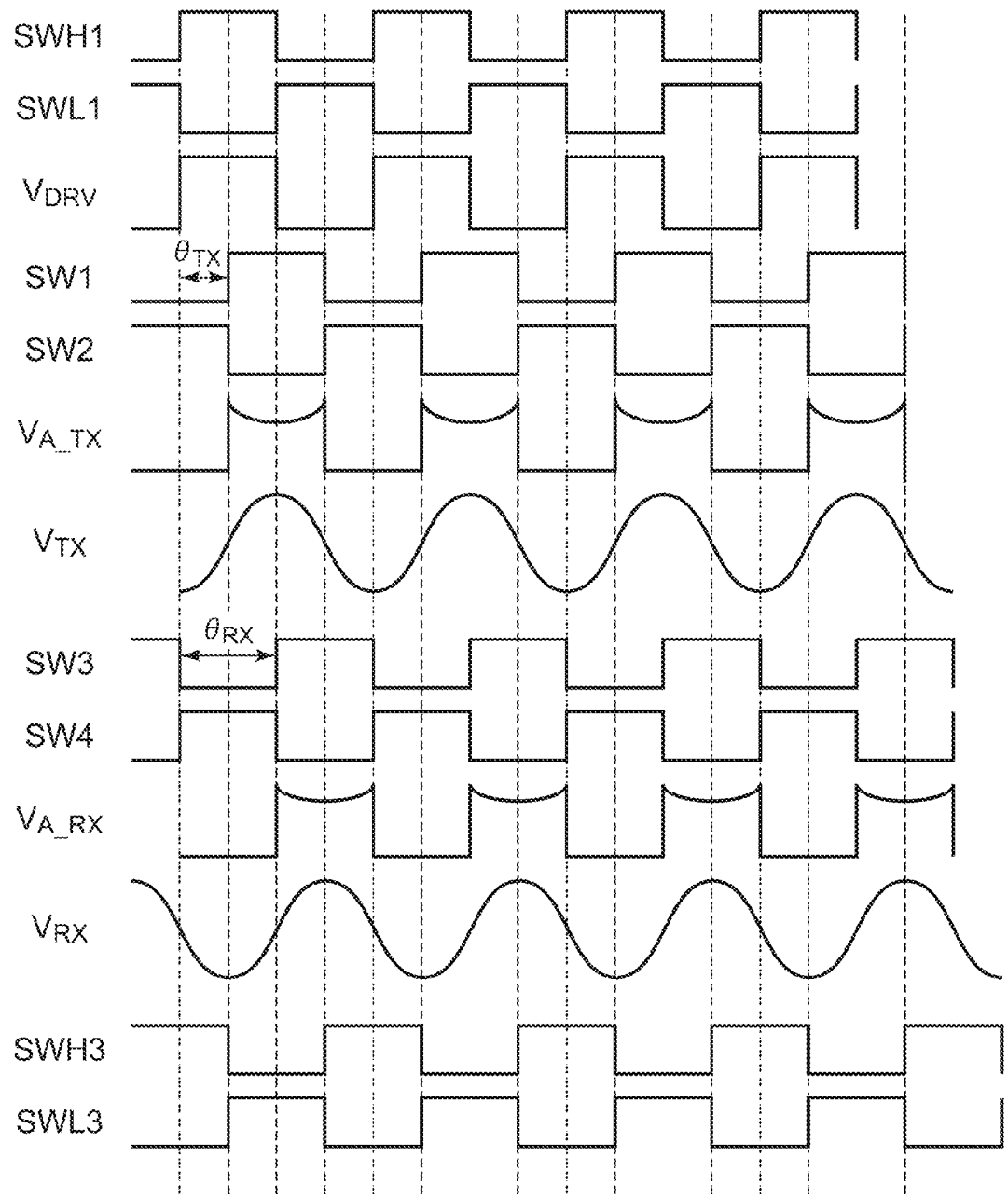
FIG. 21 is a waveform diagram showing the operation of the wireless power supply system shown in FIG. 20.

The above is the configuration of the wireless power supply system 1. FIG. 21 is a waveform diagram showing the operation of the wireless power supply system 1 shown in FIG. 20.

With the wireless power transmitting apparatus 2, the first switch SW1 and the second switch SW2 are driven with a phase that is delayed by $\theta_{TX}$=90 degrees with respect to the driving voltage $V_{DRV}$. As a result, the wireless power transmitting apparatus 2 provides a quasi-resonant state.

With the wireless power receiving apparatus 4, the third switch SW3 and the fourth switch SW4 are driven with a phase that is delayed by $\theta_{RX}$=180 degrees with respect to the driving voltage $V_{DRV}$ employed on the wireless power transmitting apparatus 2 side. The third switch SW3 is driven with a phase that is delayed by 90 degrees with respect to the first switch SW1. As a result, the wireless power receiving apparatus 4 also provides a quasi-resonant state.

The third high-side switch SWH3 and the third low-side switch SWL3 of the rectifier circuit 72 are driven with a phase that is delayed by 90 degrees with respect to the third switch SW3 and the fourth switch SW4. As a result, a DC voltage is generated at the smoothing capacitor C3. The switching regulator 74 converts the DC voltage thus generated into an optimum voltage level for the load circuit 76.

The above is the operation of the wireless power supply system 1. As described above, with the wireless power supply system 1, the wireless power transmitting apparatus 2 and the wireless power receiving apparatus 4 each include an automatic tuning assist circuit. Thus, such an arrangement allows the maximum electric power to be transmitted to the load 70.

It is needless to say that any of the aforementioned wireless power transmitting apparatuses 2 including the modifications may be combined with any of the aforementioned wireless power receiving apparatuses 4 including the modifications.

Description has been made with reference to FIG. 20 regarding an arrangement in which an automatic tuning assist circuit is mounted on both the wireless power transmitting apparatus 2 and the wireless power receiving apparatus 4. However, the present invention is not restricted to such an arrangement.

Also, an arrangement may be made in which such an automatic tuning assist circuit is provided to only the wireless power transmitting apparatus 2, and the wireless power receiving apparatus adjusts the resonance capacitor $C_{RX}$ in the same way as with conventional techniques.

Conversely, an arrangement may be made in which such an automatic tuning assist circuit is provided to only the wireless power receiving apparatus 4, and the wireless power transmitting apparatus 2 adjusts the resonance capacitor $C_{TX}$ in the same way as with conventional techniques.

Also, an arrangement may be made in which such an automatic tuning assist circuit is provided to only the wireless power transmitting apparatus 2, and the wireless power receiving apparatus 4 has no adjustment mechanism. Alternatively, an arrangement may be made in which such an automatic tuning assist circuit is provided to only the wireless power receiving apparatus 4, and the wireless power transmitting apparatus 2 has no adjustment mechanism.

With such arrangements, tuning is performed by means of a single automatic tuning assist circuit so as to provide impedance matching between the power supply 10 and the load 70, thereby providing high-efficiency electric power transmission. It is needless to say that, with such arrangements, the optimum value of the phase $\theta_{TX}$ ($\theta_{RX}$) of the switching of the automatic tuning assist circuit does not match the aforementioned values, i.e., 90 degrees or otherwise 270 degrees (180 degrees or otherwise 0 degrees).

Description has been made regarding the present invention with reference to the first embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

With the wireless power transmitting apparatus 2 including the automatic tuning assist circuit 30, in some cases, such an arrangement is capable of providing a quasi-resonant state even without including the resonance capacitor $C_{TX}$. In this case, such a resonance capacitor $C_{TX}$ may be omitted. In the same way, an arrangement may be made in which the wireless power receiving apparatus 4 including the automatic tuning assist circuit 60 does not include the resonance capacitor $C_{RX}$.

The wireless power transmitting apparatus 2 encrypts the electric power signal S1 by changing at least one of the frequency $f_{TX}$ and the phase of the driving voltage $V_{DRV}$ according to a predetermined rule (encryption code). In a case in which the wireless power receiving apparatus 4 knows the encryption code, the wireless power receiving apparatus 4 controls the switching frequency and phase of the automatic tuning assist circuit 60 based on the encryption code. As a result, even if the electric power signal S1 is encrypted, such an arrangement is capable of decrypting the electric power signal S1 and receiving the power supply. In a case in which a wireless power receiving apparatus does not know the encryption code, the wireless power receiving apparatus cannot appropriately control the switching operation of the automatic tuning assist circuit 60. Thus, such a wireless power receiving apparatus cannot receive electric power. With wireless power transmission, there is a problem of potential power theft by malicious users. However, by employing such an automatic tuning assist circuit, such a problem can be solved.

Also, in a case in which a single wireless power transmitting apparatus 2 supplies electric power to multiple wireless power receiving apparatuses 4, by employing such an automatic tuning assist circuit, such an arrangement is capable of controlling the amount of electric power to be supplied to each terminal.

Second Embodiment

Description has been made in the first embodiment regarding the automatic tuning assist circuit including the two switches SW1 and SW2. An automatic tuning assist circuit according to a second embodiment has a configuration including four switches. The automatic tuning assist circuit according to the second embodiment has the same block configuration as that of the first embodiment except for the automatic tuning assist circuit 80. Also, various kinds of modifications as described in the first embodiment may effectively be made for the second embodiment.

Wireless Power Receiving Apparatus

Figure 22:
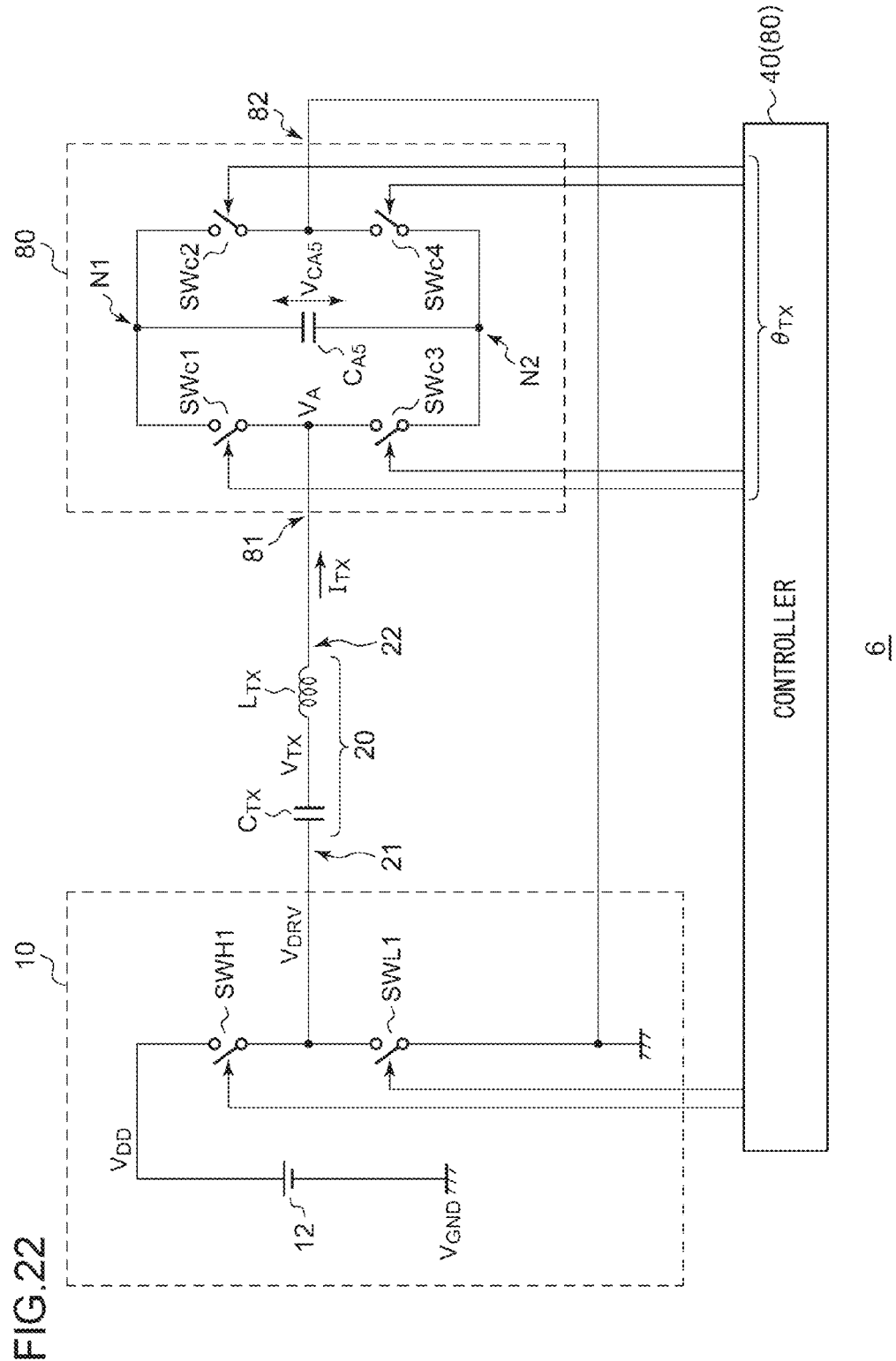
FIG. 22 is a circuit diagram showing a configuration of a wireless power receiving apparatus according to a second embodiment.

FIG. 22 is a circuit diagram showing a configuration of a wireless power transmitting apparatus 2 according to a second embodiment. The wireless power transmitting apparatus 2 transmits an electric power signal S1 to a wireless power receiving apparatus (not shown). The electric power signal S1 is configured using the near-field components (electric field, magnetic field, or electromagnetic field) of electromagnetic waves that have not yet become radio waves.

The wireless power transmitting apparatus 6 includes a power supply 10, a transmission antenna 20, an automatic tuning assist circuit 80, and a first controller 40.

The transmission antenna 20 includes a transmission coil $L_{TX}$ arranged between its first terminal 21 and its second terminal 22. A resonance capacitor $C_{TX}$ is arranged in series with the transmission coil $L_{TX}$. The resonance capacitor $C_{TX}$ and the transmission coil $L_{TX}$ may also be mutually exchanged.

The automatic tuning assist circuit 80 is coupled in series with the transmission antenna 20. The power supply 10 is configured as a half-bridge circuit in the same way as shown in FIG. 2. The power supply 10 applies an AC driving voltage $V_{DRV}$ having a predetermined transmission frequency $f_{TX}$ across a series circuit that comprises the transmission antenna 20 and the automatic tuning assist circuit 80. The driving voltage $V_{DRV}$ may be configured to have a desired AC waveform, examples of which include a rectangular waveform, a trapezoidal waveform, a sine waveform, and the like. With the present embodiment, the driving voltage $V_{DRV}$ is configured as a rectangular wave signal which swings between a first voltage level (power supply voltage $V_{DD}$) and a second voltage level (ground voltage $V_{GND}$=0 V).

The power supply 10 is configured as a half-bridge circuit, as with the power supply 10 shown in FIG. 2. The first controller 40 switches on and off the first high-side switch SWH1 and the first low-side switch SWL1 in a complementary manner, with a transmission frequency $f_{TX}$.

With the second embodiment, the automatic tuning assist circuit 80 includes a first terminal 81, a second terminal 82, a first switch SWc1 through a fourth switch SWc4, and a first auxiliary capacitor $C_{A5}$.

The first switch SWc1 and the second switch SWc2 are sequentially arranged in series between the first terminal 81 and the second terminal 82. The third switch SWc3 and the fourth switch SWc4 are sequentially arranged between the first terminal 81 and the second terminal 82, and are arranged in parallel with the first switch SWc1 and the second switch SWc2. The first auxiliary capacitor $C_{A5}$ is arranged between a connection node N1 that connects the first switch SWc1 and the second switch SWc2 and a connection node N2 that connects the third switch SWc3 and the fourth switch SWc4. The first auxiliary capacitor $C_{A5}$ is preferably configured to have a capacitance that is sufficiently greater than that of the resonance capacitor $C_{TX}$.

The first controller 40 switches on and off the first switch SWc1 through the fourth switch SWc4 in a complementary manner, with the same frequency $f_{TX}$ as that of the driving voltage $V_{DRV}$, and with a predetermined phase difference $\theta_{TX}$ with respect to the driving voltage $V_{DRV}$. The phase difference $\theta_{TX}$ is preferably set to a value in the vicinity of +90 degrees or otherwise −90 degrees (270 degrees). That is to say, a part of the first controller 40 functions as a component of the automatic tuning assist circuit 80.

In the same way as with the first embodiment, the first switch SWc1 through the fourth switch SWc4 may each be configured as a uni-directional switch or otherwise a bi-directional switch. In a case in which the first switch SWc1 through the fourth switch SWc4 are each configured as a uni-directional switch, there is a need to pay attention to their switching phases, as described above in the first embodiment.

The above is the configuration of the wireless power transmitting apparatus 6. Next, description will be made regarding the operation thereof.

Figure 23:
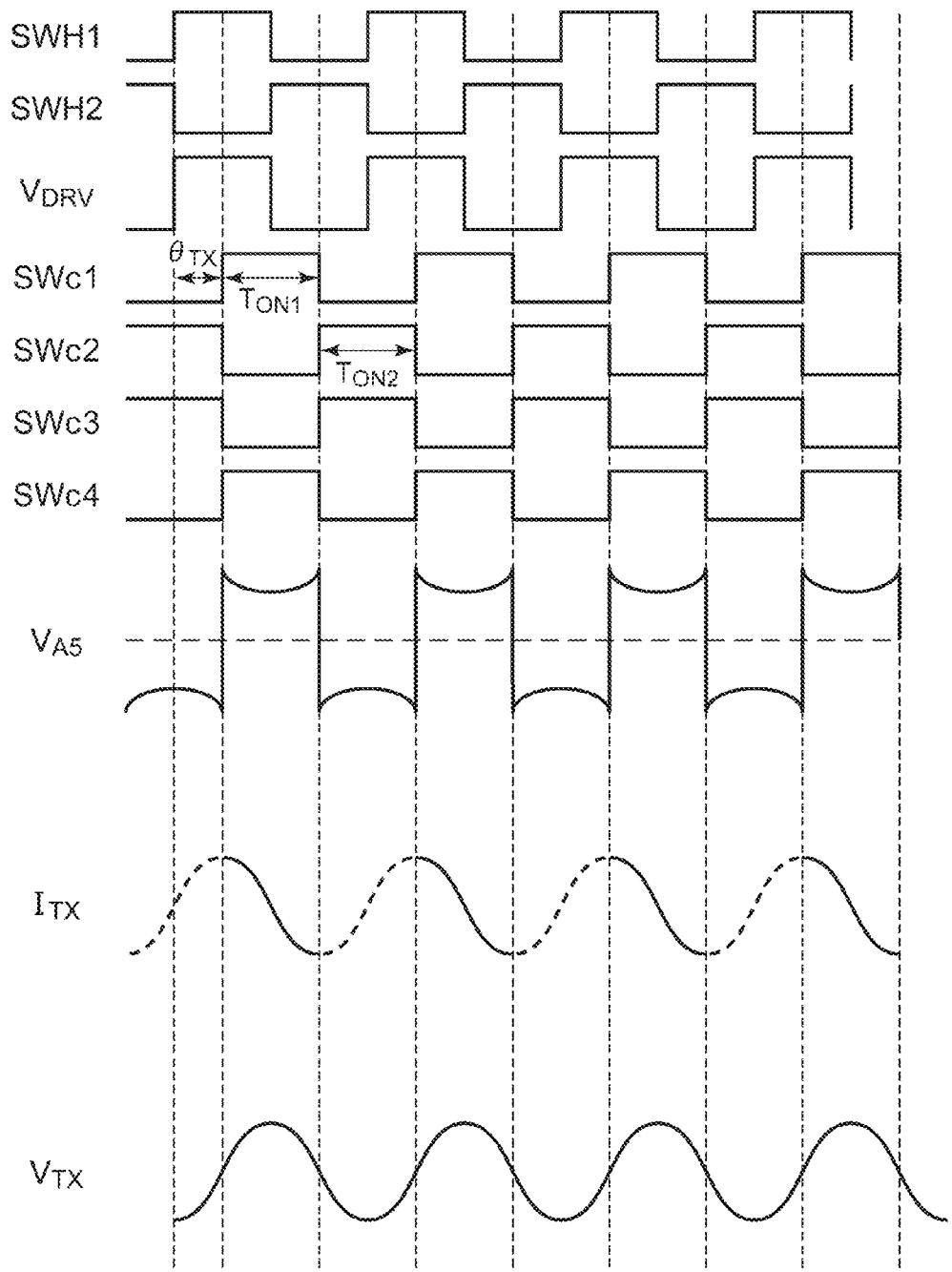
FIG. 23 is a waveform diagram showing the operation of the wireless power transmitting apparatus shown in FIG. 22.

FIG. 23 is a waveform diagram showing the operation of the wireless power transmitting apparatus 6 shown in FIG. 22. FIG. 23 shows, in the following order beginning from the top, the voltage at the first high-side switch SWH1, the voltage at the first low-side switch SWL1, the driving voltage $V_{DRV}$, the voltage at the first switch SWc1, the voltage at the second switch SWc2, the voltage at the third switch SWc3, the voltage at the fourth switch SWc4, the correction voltage $V_A$ generated at the first terminal 81, the resonance current $I_{TX}$ that flows through the transmission antenna 20, and the resonance voltage $V_{TX}$ that develops across a series circuit including the transmission coil $L_{TX}$ and the resonance capacitor $C_{TX}$. In the waveform diagram for each switch, the high level represents the on state, and the low level represents the off state. It should be noted that FIG. 23 shows the waveforms of the resonance current $I_{TX}$ and the resonance voltage $V_{TX}$ obtained after a sufficient time has elapsed after the automatic tuning assist circuit 80 starts to operate.

As shown in FIG. 23, by switching on and off the first high-side switch SWH1 and the first low-side switch SWL1 in a complementary manner, such an arrangement is capable of generating the driving voltage $V_{DRV}$ having a rectangular waveform. The driving voltage $V_{DRV}$ thus generated is applied across a series circuit including the transmission antenna 20 and the automatic tuning assist circuit 80a. The first controller 40 drives a first pair P1 comprising the first switch SWc1 and the fourth switch SWc4 with the same frequency as that of the driving voltage $V_{DRV}$, and with a phase that is delayed by $\theta_{TX}$ (=90 degrees) with respect to the driving voltage $V_{DRV}$. Furthermore, the first controller 40 drives a second pair P2 comprising the second switch SWc2 and the third switch SWc3 in a complementary manner with respect to the first pair P1, i.e., with a phase that is shifted by 180 degrees with respect to that of the first pair P1.

During the on time $T_{ON1}$ of the first pair P1, the resonance current $I_{TX}$ flows through a path including the first switch SWc1, the first auxiliary capacitor $C_{A5}$, and the fourth switch SWc4. During the on time $T_{ON2}$ of the second pair P2, the resonance current $I_{TX}$ flows through a path including the third switch SWc3, the first auxiliary capacitor $C_{A5}$, and the second switch SWc2.

That is to say, the first auxiliary capacitor $C_{A5}$ is charged and discharged by means of the resonance current $I_{TX}$. As a result, the capacitor voltage $V_{CA5}$ develops at the first auxiliary capacitor $C_{A5}$.

The automatic tuning assist circuit 80 applies a correction voltage $V_A$ to the second terminal 22 of the transmission antenna 20. During the on time $T_{ON1}$ of the first pair P1, the correction voltage $V_A$ is set to a first polarity. During the on time $T_{ON2}$ of the second pair P2, the correction voltage $V_A$ is set to a second polarity. The automatic tuning assist circuit 80 can be regarded as a correction power supply configured to apply the correction voltage $V_A$ to the transmission antenna 20. That is to say, it can be clearly understood that the wireless power transmitting apparatus 6 can be represented by the same equivalent circuit as that shown in FIG. 5, and is configured to operate according to the same operation mechanism.

That is to say, in a case in which the automatic tuning assist circuit 80 operates, the correction voltage $V_A$ is applied to the transmission antenna 20 with a phase that is delayed by $\theta_{TX}$=90 degrees with respect to the driving voltage $V_{DRV}$. As a result, phase matching is obtained between the resonance current $I_{TX}$ and the driving voltage $V_{DRV}$, thereby providing a quasi-resonant state. In this state, the resonance current $I_{TX}$ has a greater amplitude than that in the non-resonant state. This is as shown in the phasor diagrams in FIGS. 7 and 9.

The operation of the automatic tuning assist circuit 80 according to the second embodiment is the same as described in the first embodiment with reference to FIG. 8. Thus, such an arrangement is capable of automatically generating the correction voltage $V_A$ which provides a quasi-resonant state.

The above is the operation of the wireless power transmitting apparatus 6.

As described above, without adjusting the resonance frequency $f_c$ of the transmission antenna 20, the wireless power transmitting apparatus 6 is capable of automatically tuning the circuit state so as to provide the quasi-resonant state. In the wireless power transmission, the resonance frequency changes over time according to the position relation between the wireless power transmitting apparatus and the wireless power receiving apparatus. The wireless power transmitting apparatus 6 is capable of following the change in the resonance frequency with high speed, thereby providing high-efficiency electric power transmission.

Furthermore, in a case in which a large amount of electric power is transmitted by means of wireless power transmission, a very high voltage across the resonance capacitor $C_{TX}$, which limits the use of a variable capacitor. With the wireless power transmitting apparatus 6, there is no need to adjust the capacitance of the resonance capacitor $C_{TX}$. Thus, such an arrangement does not require such a variable capacitor or the like, which is another advantage.

Description has been made above regarding an arrangement in which the first pair comprising the first switch SWc1 and the fourth switch SWc4 is switched on and off with a phase that is delayed by $\theta_{TX}$ (=90 degrees) with respect to the phase of the switching of the first high-side switch SWH1 (driving voltage $V_{DRV}$). However, the phase difference $\theta_{TX}$ between the first pair and the first high-side switch SWH1 is not restricted to 90 degrees. Also, an arrangement may be made in which the phase difference $\theta_{TX}$ between the first pair and the first high-side switch SWH1 is set to 270 degrees (−90 degrees). In this case, the capacitor voltage $V_{CA1}$ is automatically adjusted such that the polarity reverses. In a case in which the first switch SWc1 through the fourth switch SWc4 are each configured as a unidirectional switch, there is a need to switch on and off the first switch SWc1 through the fourth switch SWc4 with a phase such that no current flows through each of the inversely conducting elements. Specifically, in a case in which $f_c<f_{TX}$, the phase difference $\theta_{TX}$ is preferably set to 90 degrees. Conversely, in a case in which $f_c>f_{TX}$, the phase difference $\theta_{TX}$ is preferably set to 270 degrees.

Also, the phase difference $\theta_{TX}$ may be moved away from 90 degrees or 270 degrees, as described in the first embodiment.

Next, description will be made regarding modifications of the wireless power transmitting apparatus 6. Each modification may be combined with any one of the other modifications, which is encompassed within the scope of the present invention.

Figure 24:
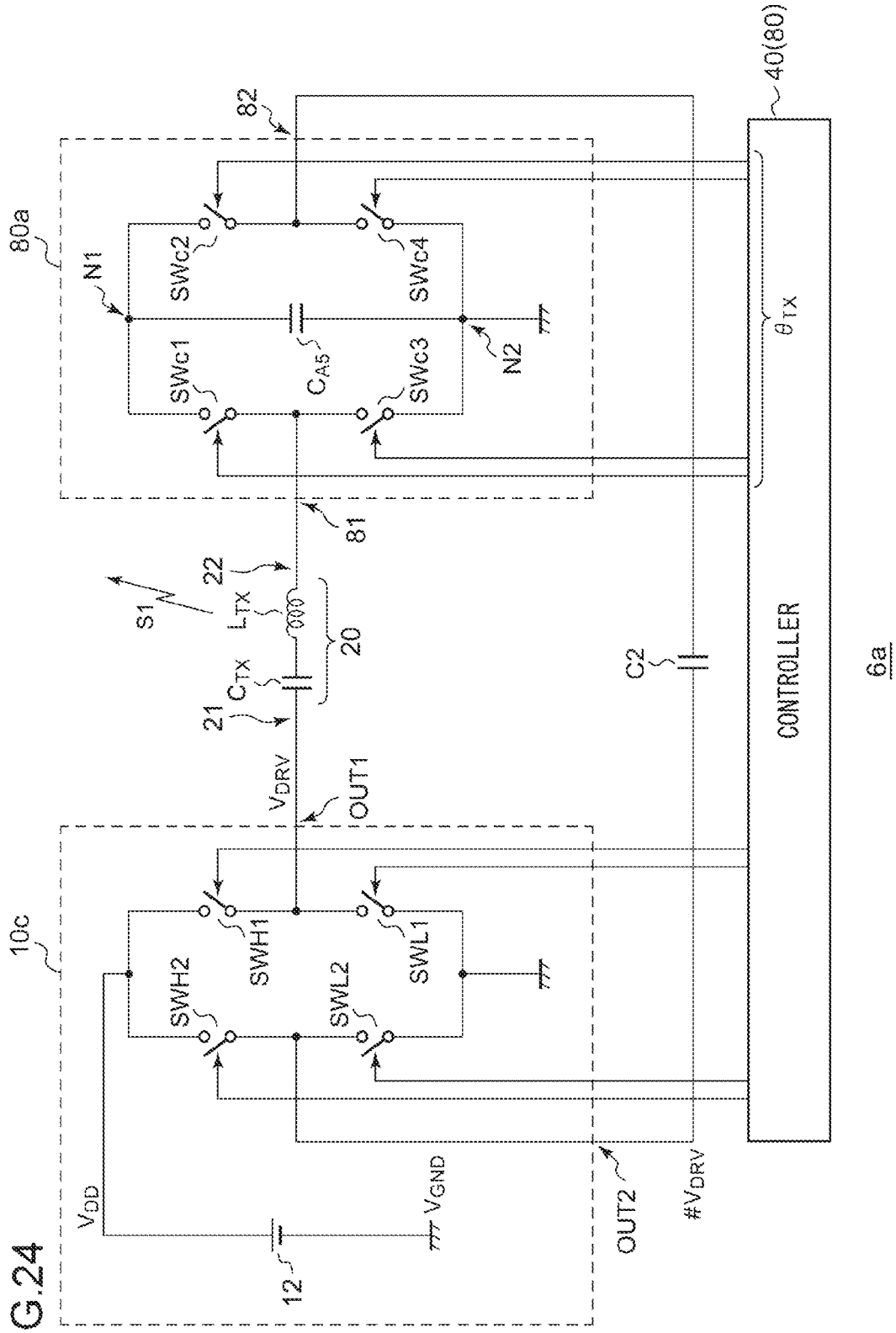
FIG. 24 is a circuit diagram showing a configuration of a wireless power transmitting apparatus according to a first modification.

FIG. 24 is a circuit diagram showing a configuration of a wireless power transmitting apparatus 6a according to a first modification. A power supply 10c shown in FIG. 24 is configured as an H-bridge circuit. A transmission antenna 20 and an automatic tuning assist circuit 80a are arranged in series between a first output terminal OUT1 and a second output terminal OUT2 of a power supply 10c. Furthermore, a capacitor C2 configured to block DC current is arranged in series with the transmission antenna 20 and the automatic tuning assist circuit 80a. With the automatic tuning assist circuit 80a, one end (N2) of a first auxiliary capacitor $C_{A5}$ is grounded.

With the wireless power transmitting apparatus 6a shown in FIG. 24, such an arrangement provides the same advantages as those provided by the wireless power transmitting apparatuses described above.

Figure 25A:
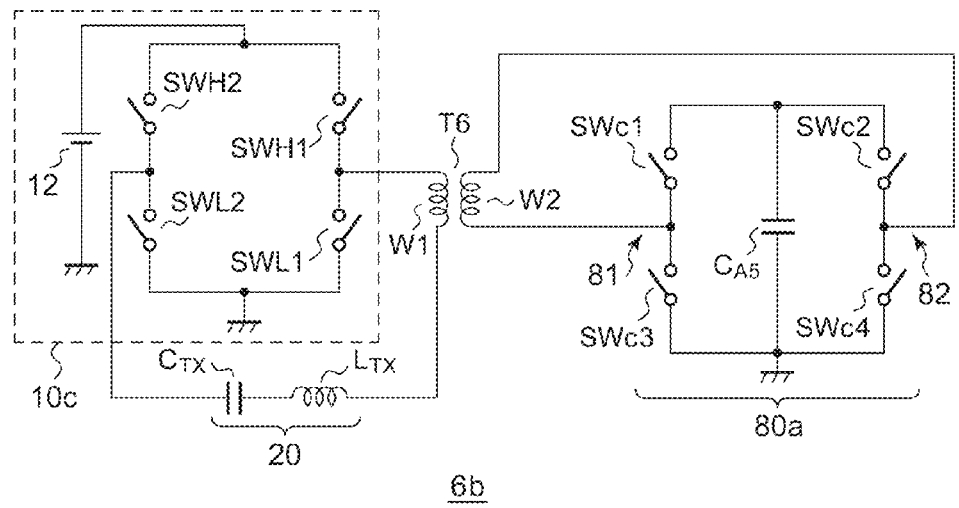
FIGS. 25A through 25C are circuit diagrams showing the configurations of wireless power transmitting apparatuses according to a second modification through a fourth modification, respectively.
Figure 25B:
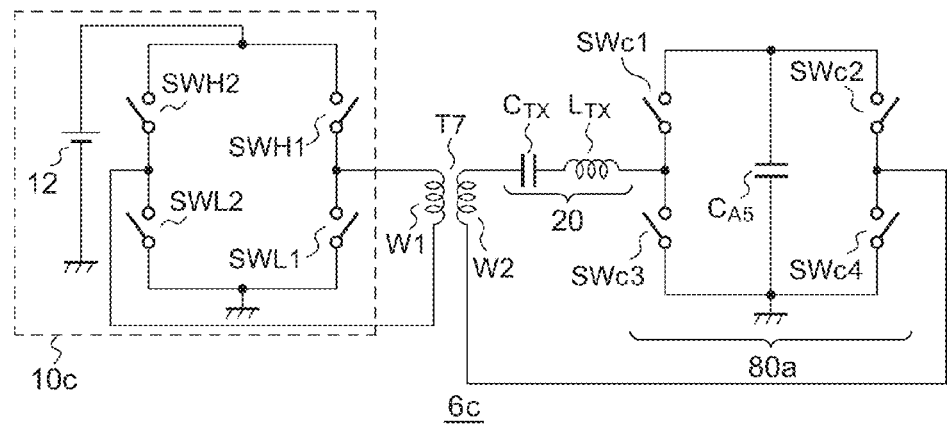
Figure 25C:
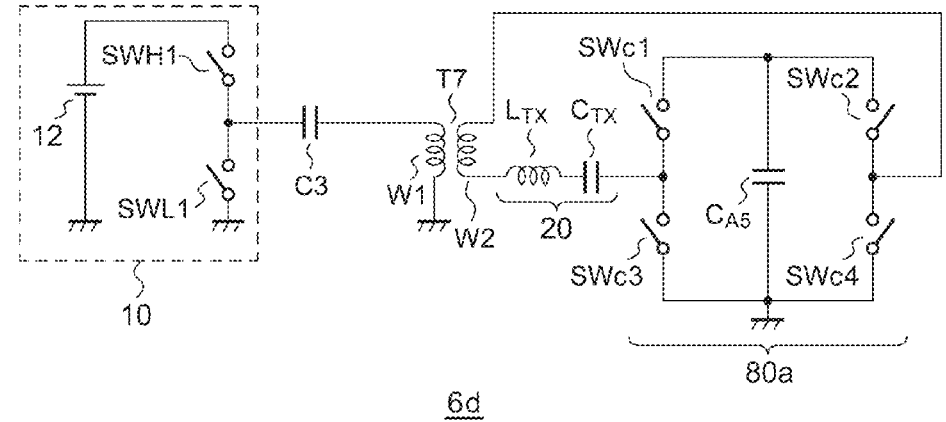

As described in the first embodiment, the power supply, the automatic tuning assist circuit, or otherwise both of them, may be coupled with the transmission antenna 20 via a transformer. FIGS. 25A through 25C are circuit diagrams respectively showing the configurations of wireless power transmitting apparatuses 6b through 6d according to second through fourth modifications. The first controller 40 is not shown.

With the wireless power transmitting apparatus 6b shown in FIG. 25A, the automatic tuning assist circuit 80a is coupled in series with the transmission antenna 20 via a sixth transformer T6. Specifically, the sixth transformer T6 is configured to have a primary winding W1 connected in series with the transmission antenna 20, and to have a secondary winding W2 connected between the first terminal 61 and the second terminal 62 of the automatic tuning assist circuit 80a. The power supply 10c applies a driving voltage across a series circuit that comprises the transmission antenna 20 and the primary winding W1 of the sixth transformer T6.

With a wireless power transmitting apparatus 6c shown in FIG. 25B, the power supply 10c is coupled with the transmission antenna 20 and the automatic tuning assist circuit 80a via a seventh transformer T7. The power supply 10c applies a driving voltage across the primary winding W1 of the seventh transformer T7. The transmission antenna 20 and the automatic tuning assist circuit 80a are arranged in series with the secondary winding W2.

With a wireless power transmitting apparatus 6d shown in FIG. 25C, the power supply 10 having a half-bridge configuration is coupled with the transmission antenna 20 and the automatic tuning assist circuit 80a via the seventh transformer T7. A capacitor C3 configured to block DC current is arranged between the output terminal of the power supply 10 and the first winding W1 of the seventh transformer T7.

Also, the modifications shown in FIGS. 25A through 25C may be combined. That is to say, both the power supply and the automatic tuning assist circuit may be coupled with the transmission antenna via a transformer.

Such modifications also provide the same advantages provided by the wireless power transmitting apparatuses described above.

Wireless Power Receiving Apparatus

The automatic tuning assist circuit according to the second embodiment described above may be employed in a wireless power receiving apparatus. Description will be made below regarding such a wireless power receiving apparatus.

Figure 26:
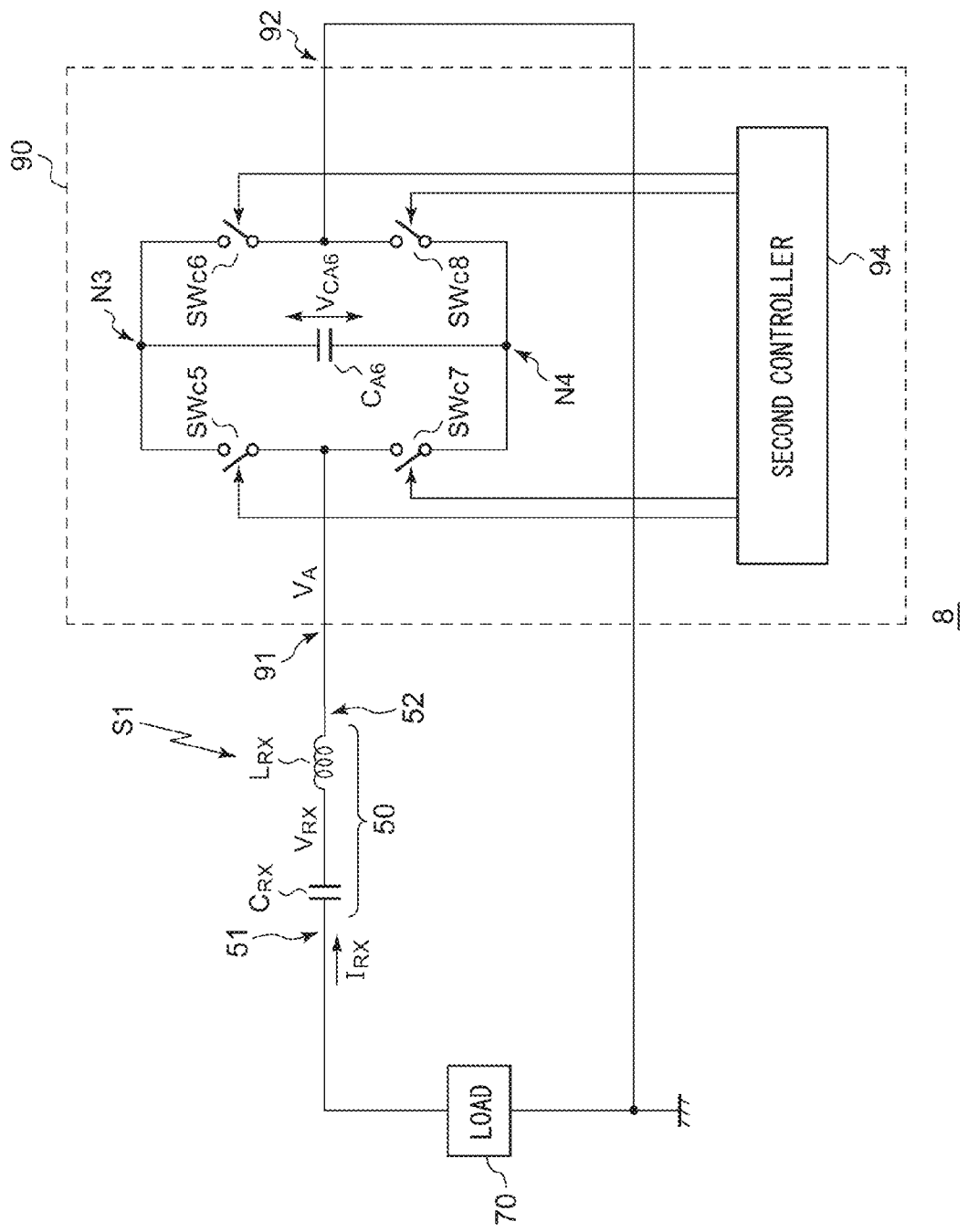
FIG. 26 is a circuit diagram showing a configuration of a wireless power receiving apparatus according to the second embodiment.

FIG. 26 is a circuit diagram showing a wireless power receiving apparatus 8 according to the second embodiment. The wireless power receiving apparatus 8 receives the electric power signal S1 transmitted from the aforementioned wireless power transmitting apparatus or otherwise a wireless power transmitting apparatus having an entirely different configuration. The electric power signal S1 is configured using the near-field components (electric field, magnetic field, or electromagnetic field) of electromagnetic waves that have not yet become radio waves.

The wireless power receiving apparatus 8 includes a reception antenna 50, an automatic tuning assist circuit 90, and a load 70 to be supplied with electric power. The load 70 may include an unshown rectifier circuit, detector circuit, or the like, as a built-in component.

The reception antenna 50 includes a reception coil $L_{RX}$ and a resonance capacitor $C_{RX}$ arranged in series between a first terminal 51 and a second terminal 52.

The automatic tuning assist circuit 90 has the same configuration as that of the automatic tuning assist circuit 80 shown in FIG. 22. Specifically, the automatic tuning assist circuit 90 includes a first terminal 91, a fifth switch SWc5 through an eighth switch SWc8, and a second auxiliary capacitor $C_{A6}$.

The fifth switch SWc5 and the sixth switch SWc6 are arranged in series between the first terminal 91 and the second terminal 92. The seventh switch SWc7 and the eighth switch SWc8 are sequentially arranged in series between the first terminal 91 and the second terminal 92. Furthermore, the seventh switch SWc7 and the eighth switch SWc8 are arranged in parallel with the fifth switch SWc5 and the sixth switch SWc6. The second auxiliary capacitor $C_{A6}$ is arranged between a connection node N3 that connects the fifth switch SWc5 and the sixth switch SWc6 and a connection node N4 that connects the seventh switch SWc7 and the eighth switch SWc8. The second auxiliary capacitor $C_{A6}$ is preferably configured to have a sufficiently great capacitance as compared with the resonance capacitance $C_{RX}$.

A second controller 94 is configured to switch on and off the fifth switch SWc5 through the eighth switch SWc8 with the same frequency as that of the electric power signal S1, and with a phase difference $\theta_{RX}$ with respect to the driving voltage ($V_{DRV}$) which is applied to the transmitter-side antenna. For example, the phase difference $\theta_{RX}$ is preferably set to 180 degrees or otherwise 0 degrees.

The automatic tuning assist circuit 90 is coupled in series with the reception antenna 50. Furthermore, the load 70 to be supplied with electric power is directly connected with the reception antenna 50 and the automatic tuning assist circuit 90.

The above is the configuration of the wireless power receiving apparatus 8. Next, description will be made regarding the operation thereof. The wireless power receiving apparatus 8 can be represented by the same equivalent circuit diagram as that which represents the wireless power receiving apparatus 4 shown in FIG. 15. As with the automatic tuning assist circuit 80 of the wireless power transmitting apparatus 6, the automatic tuning assist circuit 90 can be regarded as a correction power supply configured to apply a correction voltage $V_A$ to the reception antenna 50.

FIG. 27 is a waveform diagram showing the operation of the wireless power receiving apparatus 8 shown in FIG. 26. FIG. 27 shows the voltages applied to the fifth switch SWc5 through the eighth switch SWc8, the correction voltage $V_A$, the resonance current $I_{RX}$ that flows through the reception antenna 50, and the resonance voltage $V_{RX}$ that develops across a series circuit including the reception coil $L_{RX}$ and the resonance capacitor $C_{RX}$. In the waveform diagrams showing the voltages applied to the respective switches, the high-level state represents the on state, and the low-level state represents the off state.

A first pair comprising the fifth switch SWc5 and the eighth switch SWc8 is switched on and off with a phase $\theta_{RX}$ which is shifted by 180 degrees or otherwise 0 degrees with respect to the driving voltage $V_{DRV}$ of the wireless power transmitting apparatus side. A second pair comprising the sixth switch SWc6 and the seventh switch SWc7 is switched on and off in a complementary manner with respect to the first pair. During the on time $T_{ON1}$ of the first pair, the resonance current $I_{RX}$ flows through a path comprising the fifth switch SWc5, the second auxiliary capacitor $C_{A6}$, and the eighth switch SWc8. During the on time $T_{ON2}$ of the second pair, the resonance current $I_{RX}$ flows through a path comprising the sixth switch SWc6, the second auxiliary capacitor $C_{A6}$, and the seventh switch SWc7.

The second auxiliary capacitor $C_{A6}$ is charged and discharged by means of the resonance current $I_{RX}$. As a result, a capacitor voltage $V_{CA6}$ develops at the capacitor $C_{A6}$. With such an arrangement, the correction voltage $V_A$ that corresponds to the capacitor voltage $V_{CA6}$ is applied to the reception antenna 50. Thus, such an arrangement allows the resonance current $I_A$ to have a phase that matches the phase of the driving voltage $V_{DRV}$ that is used in the transmitter side, thereby providing a quasi-resonant state.

In order to provide a quasi-resonant state, there is a need to switch on and off the fifth switch SWc5 and the eighth switch SWc8 with a suitable frequency $f_{TX}$ and with a suitable phase $\theta_{RX}$. In order to meet this requirement, the wireless power transmitting apparatus may be configured to transmit the data which represents the frequency $f_{TX}$ and the phase $\theta_{RX}$ to the wireless power receiving apparatus 8. Also, the wireless power receiving apparatus 8 may be configured to sweep the phase $\theta_{RX}$ so as to detect the optimum phase $\theta_{RX}$.

The above is the operation of the wireless power receiving apparatus 8.

As described above, with the wireless power receiving apparatus 8 shown in FIG. 26, such an arrangement automatically provides a resonant state without a need to adjust the capacitance of the resonance capacitor $C_{RX}$.

Next, description will be made regarding modifications of the wireless power receiving apparatus 8.

Description has been made with reference to FIG. 26 regarding an arrangement in which one terminal of the load 70 is grounded, and the ground potential is used as the reference potential. Also, instead of such an arrangement in which one terminal of the load 70 is grounded, one terminal of the second auxiliary capacitor $C_{A6}$ of the automatic tuning assist circuit 90, i.e., either the connection node N3 or N4, may be grounded.

Figure 28A:
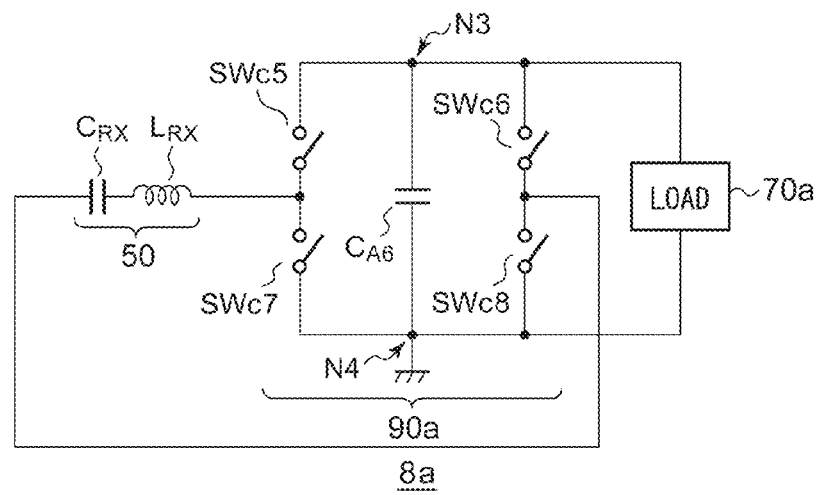
FIGS. 28A and 28B are circuit diagrams showing the configurations of wireless power receiving apparatuses according to a second modification and a third modification.
Figure 28B:
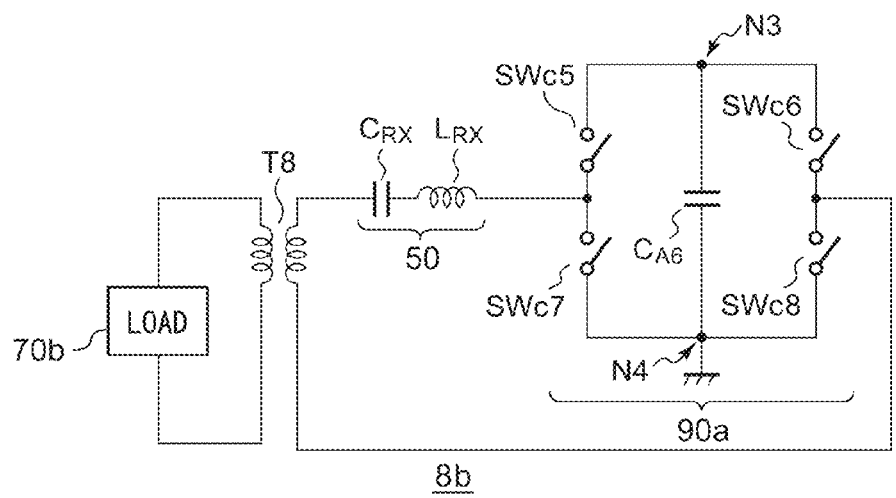

FIGS. 28A and 28B are circuit diagrams showing the configurations of wireless power receiving apparatuses according to a second modification and a third modification.

Description has been made with reference to FIG. 26 regarding an arrangement in which the load 70 is connected in series with the reception antenna 50. Also, the load 70 may be arranged at a different position.

With a wireless power receiving apparatus 8a according to a first modification shown in FIG. 28A, the connection node N4 of the automatic tuning assist circuit 90a is grounded. A load 70a is arranged in parallel with the second auxiliary capacitor $C_{A6}$. That is to say, the load 70a is supplied with a capacitor voltage $V_{CA6}$ that develops at the second auxiliary capacitor $C_{A6}$.

With a wireless power receiving apparatus 8b according to a second modification shown in FIG. 28B, a load 70b is coupled via an eighth transformer T8 with a series circuit comprising the reception antenna 50 and the automatic tuning assist circuit 90a.

Figure 28C:
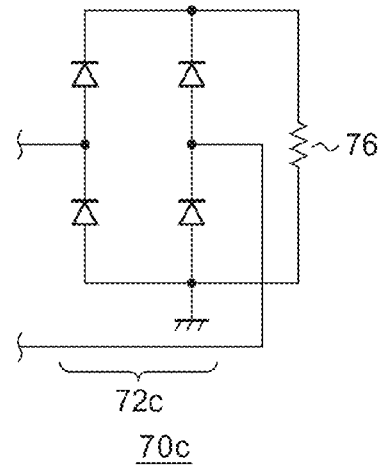
FIGS. 28C and 28D are circuit diagrams each showing an example configuration of a load.
Figure 28D:
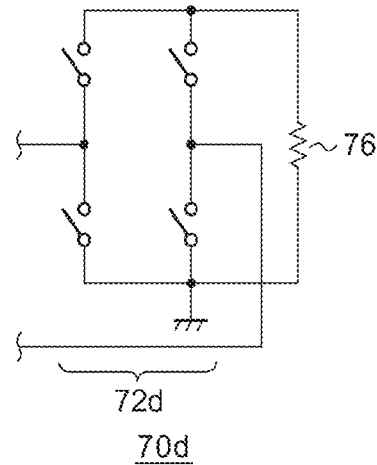

FIGS. 28C and 28D are circuit diagrams each showing an example configuration of such a load. A load 70c shown in FIG. 28C includes a diode rectifier circuit 72c and a load circuit 76. A load 70d shown in FIG. 28D includes a synchronous detector circuit 72d and the load circuit 76. Such a load circuit may further include a switching regulator 74 as shown in FIG. 20.

Figure 29:
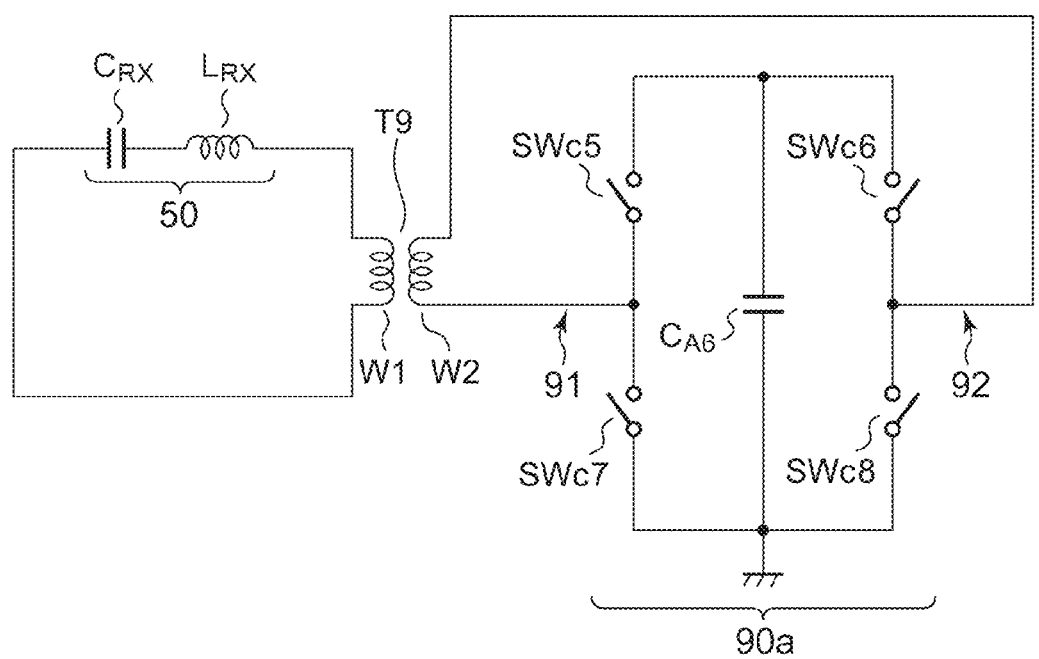
FIG. 29 is a circuit diagram showing a configuration of a wireless power receiving apparatus according to a third modification.

Such an automatic tuning assist circuit 90 may be coupled in series with the reception antenna 50 via a transformer. FIG. 29 is a circuit diagram showing a configuration of a wireless power receiving apparatus 8c according to a third modification. The automatic tuning assist circuit 90a is coupled in series with the reception antenna 50 via a ninth transformer T9. A load may be arranged in series with the reception antenna 50 and the primary winding W1. Also, such a load may be arranged in parallel with the second auxiliary capacitor $C_{A6}$.

Such modifications also provide the same advantages as those provided by the wireless power receiving apparatus 8 shown in FIG. 26.

In a case in which the load is connected in series with the reception antenna 50 as shown in FIG. 26, and in a case in which the load has a low impedance, such an arrangement has an advantage of a certain level of acquisition of electric power even without the adjustment by means of the automatic tuning assist circuit 90. However, such an arrangement has a disadvantage of a reduction of the Q-value of the reception antenna 50 due to the resistance component of the load. Thus, it is difficult for such an arrangement to acquire a large amount of electric power.

Conversely, in a case in which electric power is acquired from the automatic tuning assist circuit 90a as shown in FIG. 28A, the Q-value of the reception antenna 50 is not reduced due to the load 70. Thus, such an arrangement is capable of acquiring a large amount of electric power even in a case in which the load 70a has a high impedance. However, in a case in which the load 70a has a very low impedance, such an arrangement has a problem of a reduction in the efficiency of the operation of the automatic tuning assist circuit 60.

Thus, the position of the load in the circuit is preferably determined giving consideration to the electric power to be transmitted, the impedance of the load, and so forth.

The fifth switch SWc5 through the eighth switch SWc8 may each be configured as a uni-directional switch or otherwise a bi-directional switch. As described above, in a case in which these switches are each configured as a uni-directional switch, there is a need to pay attention to their switching phases.

Wireless Power Supply System

By combining the wireless power transmitting apparatus 6 and the wireless power receiving apparatus 8 described in the second embodiment, such an arrangement provides a wireless power supply system.

Description has been made regarding an arrangement in which an automatic tuning assist circuit is mounted on each of the wireless power transmitting apparatus 6 and the wireless power receiving apparatus 8. However, the present invention is not restricted to such an arrangement.

Also, an arrangement may be made in which such an automatic tuning assist circuit is provided to only the wireless power transmitting apparatus 6, and the wireless power receiving apparatus adjusts the resonance capacitor $C_{RX}$ in the same way as with conventional techniques. Conversely, an arrangement may be made in which such an automatic tuning assist circuit is provided to only the wireless power receiving apparatus 8, and the wireless power transmitting apparatus 6 adjusts the resonance capacitor $C_{TX}$ in the same way as with conventional techniques.

Also, an arrangement may be made in which such an automatic tuning assist circuit is provided to only the wireless power transmitting apparatus 6, and the wireless power receiving apparatus 8 has no adjustment mechanism. Alternatively, an arrangement may be made in which such an automatic tuning assist circuit is provided to only the wireless power receiving apparatus 8, and the wireless power transmitting apparatus 6 has no adjustment mechanism.

With such arrangements, tuning is performed by means of a single automatic tuning assist circuit so as to provide impedance matching between the power supply 10 and the load 70, thereby providing high-efficiency electric power transmission. It should be noted that, with such arrangements, the optimum value of the phase $\theta_{TX}$ ($\theta_{RX}$) of the switching of the automatic tuning assist circuit does not match the aforementioned values, i.e., 90 degrees or otherwise 270 degrees (180 degrees or otherwise 0 degrees).

Also, the wireless power transmitting apparatus 2 according to the first embodiment may be combined with the wireless power receiving apparatus 8 according to the second embodiment. Also, the wireless power receiving apparatus 4 according to the first embodiment may be combined with the wireless power transmitting apparatus 6 according to the second embodiment.

Description has been made regarding the present invention with reference to the second embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

With the wireless power transmitting apparatus 6 including the automatic tuning assist circuit 80, in some cases, such an arrangement is capable of providing a quasi-resonant state even while omitting the resonance capacitor $C_{TX}$. In this case, such a resonance capacitor $C_{TX}$ may be omitted. In the same way, an arrangement may be made in which the wireless power receiving apparatus 8 including the automatic tuning assist circuit 90 does not include the resonance capacitor $C_{RX}$.

The wireless power transmitting apparatus 6 encrypts the electric power signal S1 by changing at least one of the frequency $f_{TX}$ and the phase of the driving voltage $V_{DRV}$ according to a predetermined rule (encryption code). In a case in which the wireless power receiving apparatus 8 knows the encryption code, the wireless power receiving apparatus 8 controls the switching frequency and phase of the automatic tuning assist circuit 90 based on the encryption code. As a result, even if the electric power signal S1 is encrypted, such an arrangement is capable of decrypting the electric power signal S1 and receiving the power supply. In a case in which the wireless power receiving apparatus does not know the encryption code, the wireless power receiving apparatus cannot appropriately control the switching operation of the automatic tuning assist circuit 90. Thus, such a wireless power receiving apparatus cannot receive electric power. With wireless power transmission, there is a problem of potential power theft by malicious users. However, by employing such an automatic tuning assist circuit, such a problem can be solved.

Also, in a case in which a single wireless power transmitting apparatus 6 supplies electric power to multiple wireless power receiving apparatuses 8, by employing such an automatic tuning assist circuit, such an arrangement is capable of controlling the amount of electric power to be supplied to each terminal.

The usage of the automatic tuning assist circuit 30 is not restricted to such wireless power transmission. Rather, the present invention is applicable to various kinds of applications which require tuning.

Third Embodiment

If a foreign substance such as a piece of metal is interposed between the transmission coil $L_{TX}$ and the reception coil $L_{RX}$ when the wireless power transmitting apparatus 2 or otherwise the wireless power receiving apparatus 4 described above in the first or second embodiment, or otherwise modifications thereof, is in the resonant state, this leads to a change in the condition for resonance, and the resonant state is disturbed. Also, if the degree of coupling between the transmission coil $L_{TX}$ and the reception coil $L_{RX}$ changes due to movement of the wireless power receiving apparatus 4r, this leads to a change in the condition for resonance, and the resonant state is disturbed. Alternatively, if there is power theft by a malicious user, the resonant state is also disturbed. Description will be made in the third embodiment regarding a technique for detecting a disturbance in the resonant state employed in the wireless power supply system 1r.

Wireless Power Transmitting Apparatus

Figure 30:
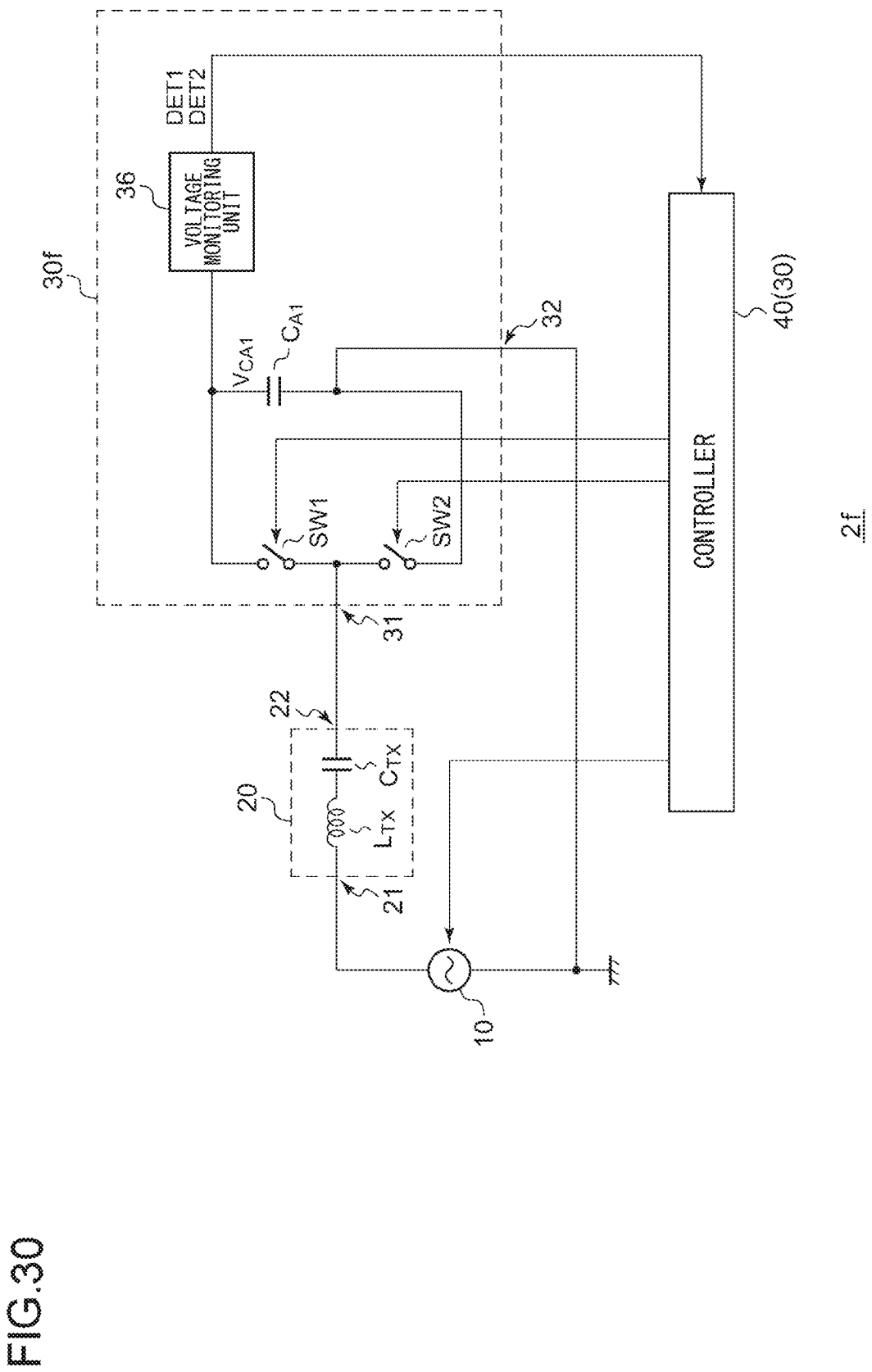
FIG. 30 is a block diagram showing a configuration of a wireless power transmitting apparatus according to a third embodiment.

FIG. 30 is a block diagram showing a configuration of a wireless power transmitting apparatus 2f according to the third embodiment. The wireless power transmitting apparatus 2f has the same basic configuration as that shown in FIG. 2. An automatic tuning assist circuit 30f further includes a voltage monitoring unit 36, in addition to the multiple switches SW1 and SW2 and the first auxiliary capacitor $C_{A1}$.

As described above, the voltage $V_{CA}$ across the first auxiliary capacitor $C_{A1}$ changes according to a change in the condition of resonance of the resonance circuit. The voltage monitoring unit 36 monitors the capacitor voltage $V_{CA1}$ that develops at the first auxiliary capacitor $C_{A1}$. The first controller 40 receives the monitoring result from the voltage monitoring unit 36 and performs predetermined processing. Description will be made below regarding specific examples of the monitoring operation performed by the voltage monitoring unit 36 and of the processing performed by the first controller 40.

First Monitoring Method

The voltage monitoring unit 36 judges whether or not the capacitor voltage $V_{CA1}$ is within a predetermined range (from $V_{MIN}$ to $V_{MAX}$). The voltage monitoring unit 36 generates a first detection signal DET1 which is asserted (e.g., set to high level) when the capacitor voltage $V_{CA1}$ deviates from the predetermined range.

Figure 31:
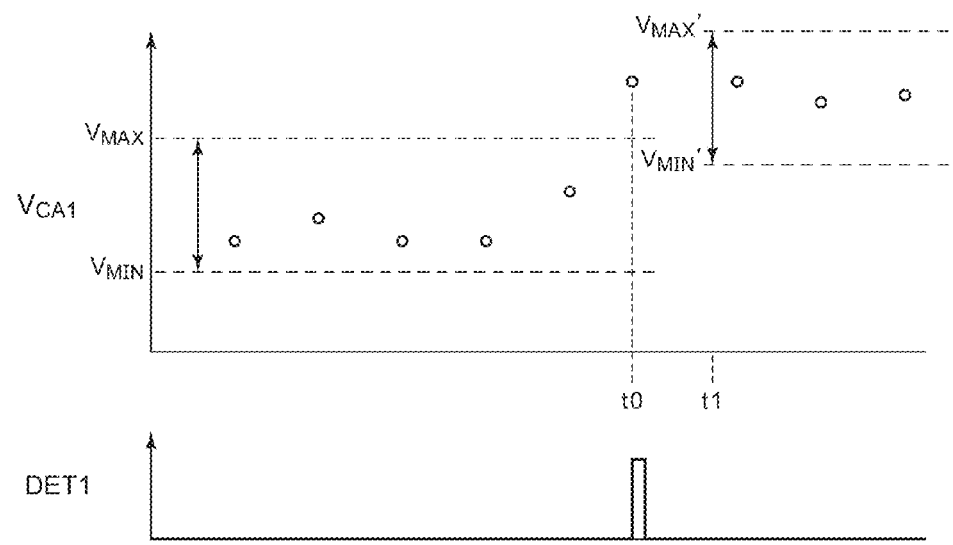
FIG. 31 is a waveform for describing a first monitoring method.

FIG. 31 is a waveform diagram for describing the first monitoring method. In the drawing, before the time point t0, the wireless power transmitting apparatus 2 and the wireless power receiving apparatus are each in a stable resonant state. In the resonant state, the capacitor voltage $V_{CA1}$ fluctuates within a predetermined range (from $V_{MIN}$ to $V_{MAX}$). At the time point t0, an event that disturbs the resonant state occurs, examples of which include: an interposition of a foreign substance such as a piece of metal in the vicinity of the transmission coil $L_{TX}$; a sudden change in the position of the wireless power receiving apparatus; and the approach of a power receiving terminal of a malicious user with the intention of engaging in power theft. In this case, the capacitor voltage $V_{CA1}$ deviates from the predetermined range (from $V_{MIN}$ to $V_{MAX}$), and accordingly, the first detection signal DET1 is asserted.

As described above, with the wireless power transmitting apparatus 2f, by monitoring the capacitor voltage $V_{CA1}$, such an arrangement is capable of detecting an event that disturbs the resonant state.

The first controller 40 is capable of performing various kinds of processing according to the first detection signal DET1. For example, when the first detection signal DET1 is asserted, the first controller 40 suspends the operation of the power supply 10 so as to temporarily suspend the power supply to the wireless power receiving apparatus. Furthermore, in addition to the first detection signal DET1, with reference to various kinds of information other than the first detection signal DET1, examples of which include data which indicates electric power transmitted by the wireless power transmitting apparatus 2f, data which indicates electric power received by the wireless power receiving apparatus arranged as a power destination, etc., the first controller 40 judges whether or not a detected event is allowable. Examples of allowable events include a disturbance in the resonant state simply due to movement of the wireless power receiving apparatus. Examples of unallowable events include power theft by a malicious user, and the interposition of a foreign substance.

When an event indicated by the first detection signal DET1 is allowable, the first controller 40 resumes the power supply at the time point t1. In this stage, the voltage monitoring unit 36 changes the predetermined range (from $V_{MIN}$ to $V_{MAX}$) to a voltage range from $V_{MIN}'$ to $V_{MAX}'$ that corresponds to a new condition for resonance.

When an event indicated by the first detection signal DET1 is unallowable, the first controller 40 does not immediately resume the power supply operation, but performs processing that corresponds to this event. For example, if there is a possibility that normal power supply cannot be performed because the wireless power receiving apparatus 4 is arranged at an inappropriate position, an unshown communication unit may transmit data to the wireless power receiving apparatus urging movement of the position of the wireless power receiving apparatus. If there is a possibility of power theft, the transmission frequency $f_{TX}$ may be changed. Alternatively, the wireless power transmitting apparatus may perform re-authentication with the wireless power receiving apparatus.

Figure 32:
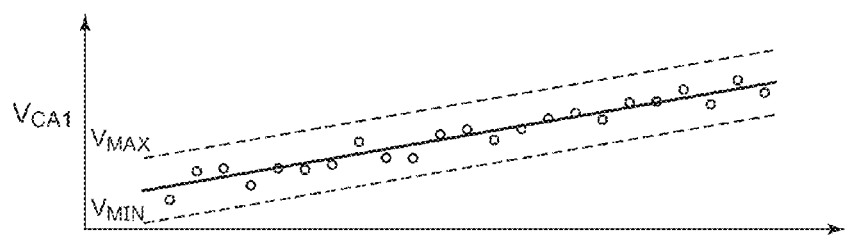
FIG. 32 is a diagram showing the relation between the capacitor voltage and a predetermined range.

The voltage monitoring unit 36 may change the predetermined range, which is used for a comparison with the capacitor voltage $V_{CA1}$, according to the capacitor voltage $V_{CA1}$. FIG. 32 is a diagram showing the relation between the capacitor voltage $V_{CA1}$ and the predetermined range. For example, the voltage monitoring unit 36 may set the predetermined range with a moving average (solid line) of the capacitor voltage $V_{CA1}$ as a reference. With such an arrangement, when the condition for resonance gradually changes, the first detection signal DET1 is not asserted, and the first detection signal DET1 is only asserted when there is a sudden change in the condition for resonance. That is to say, such an arrangement is capable of selecting the events to be detected, according to the averaging period set for the moving average. For example, interposition of a foreign substance leads to a sudden change in the capacitor voltage $V_{CA1}$. Thus, by reducing the averaging period set for the moving average, such an arrangement is capable of detecting such an event in a selective manner.

Second Monitoring Method

The voltage monitoring unit 36 monitors the time differential waveform of the capacitor voltage $V_{CA1}$, in addition to or otherwise instead of the capacitor voltage $V_{CA1}$. For example, when the time differential waveform deviates from a predetermined range (from $S_{MIN}$ to $S_{MAX}$), the voltage monitoring unit 36 asserts a second detection signal DET2.

Variation of the capacitor voltage $V_{CA1}$ occurs according to a normal tuning operation of the automatic tuning assist circuit 30f. This variation occurs with a relatively long time scale. In contrast, an abnormal event such as the interposition of a foreign substance, the approach of a terminal of a malicious user with the intention of engaging in power theft, or the like, occurs with a very short time scale. Thus, by monitoring the waveform obtained by time differentiation of the capacitor voltage $V_{CA1}$, such an arrangement is capable of distinguishing the variation of the capacitor voltage $V_{CA1}$ due to an abnormal event such as the interposition of a foreign substance, the approach of a terminal of a malicious user with the intention of engaging in power theft, or the like, from the variation that occurs according to the normal tuning operation.

Figure 33:
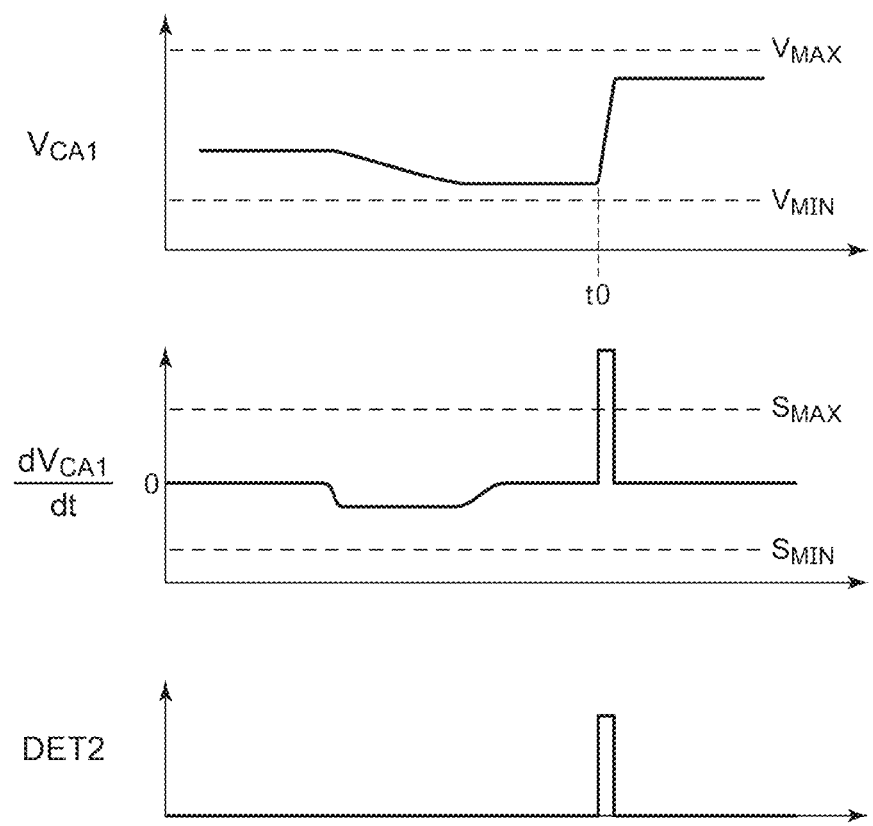
FIG. 33 is a waveform diagram for describing a second monitoring method.

FIG. 33 is a waveform diagram showing a configuration of a second monitoring method. The capacitor voltage $V_{CA1}$ varies in a predetermined voltage range (from $V_{MIN}$ to $V_{MAX}$). Before the time point t0, the capacitor voltage $V_{CA1}$ slowly varies. Accordingly, the waveform obtained by time differentiation of the capacitor voltage $V_{CA1}$ is within a predetermined range. Let us consider a case in which, at the time point t0, the capacitor voltage $V_{CA1}$ sharply changes within the predetermined range (from $V_{MIN}$ to $V_{MAX}$). In this case, the first detection signal DET1 is not asserted, and the second detection signal DET2 is asserted. In this case, the first controller 40 judges that an event has occurred which disturbs the resonant state for a short time scale, and performs the corresponding processing.

As described above, by monitoring the time differential waveform of the capacitor voltage $V_{CA1}$, in addition to the capacitor voltage $V_{CA1}$ itself, the operation of the first controller 40 can be branched according to a combination of the two detection signals DET1 and DET2.

The resonance voltage that develops at the transmission coil $L_{TX}$ and the resonance voltage that develops at the resonance capacitor $C_{TX}$ may each be configured as an AC voltage having an amplitude on the order of several hundreds of V to several kV. Thus, in a case in which such resonance voltages are directly monitored so as to detect a disturbance in the resonant state, such an arrangement requires a high breakdown voltage circuit. Furthermore, such an arrangement requires a circuit configured to detect the amplitude of an AC voltage (e.g., a rectifier circuit). In contrast, with the present embodiment, the voltage monitoring unit 36 monitors the capacitor voltage having an amplitude that is smaller than those of the resonance voltages that develop at the transmission coil $L_{TX}$ and the resonance capacitor $C_{TX}$. Thus, the voltage monitoring unit 36 can be configured using low breakdown voltage elements. Furthermore, with such an arrangement in which the capacitor voltage $V_{CA}$ is monitored, there is no need to measure the amplitude, unlike an arrangement configured to monitor the resonance voltage. Thus, such an arrangement allows the voltage monitoring unit 36 to be configured as a simple circuit.

The above is the description of the wireless power transmitting apparatus 2f according to the third embodiment. It should be noted that the configurations of the automatic tuning assist circuit and the wireless power transmitting apparatus are not restricted to those shown in FIG. 30. That is to say, the voltage monitoring unit 36 may be provided to various kinds of circuits described in the first and second embodiments. Specifically, the voltage monitoring unit 36 may be provided to the automatic tuning assist circuit 30 shown in any one of FIGS. 10, 11, 12, 13A and 13B. Also, the voltage monitoring unit 36 may be provided to the automatic tuning assist circuit 80 shown in any one of FIGS. 22, 24, and 25. Alternatively, the voltage monitoring unit 36 may be provided to modifications of the automatic tuning assist circuit 30 or 80. In a case in which multiple auxiliary capacitors are provided, the voltage monitoring unit 36 may monitor the voltage that develops at one selected from among the multiple auxiliary capacitors. Also, the voltage monitoring unit 36 may monitor multiple voltages across multiple respective auxiliary capacitors at the same time.

Wireless Power Receiving Apparatus

Figure 34:
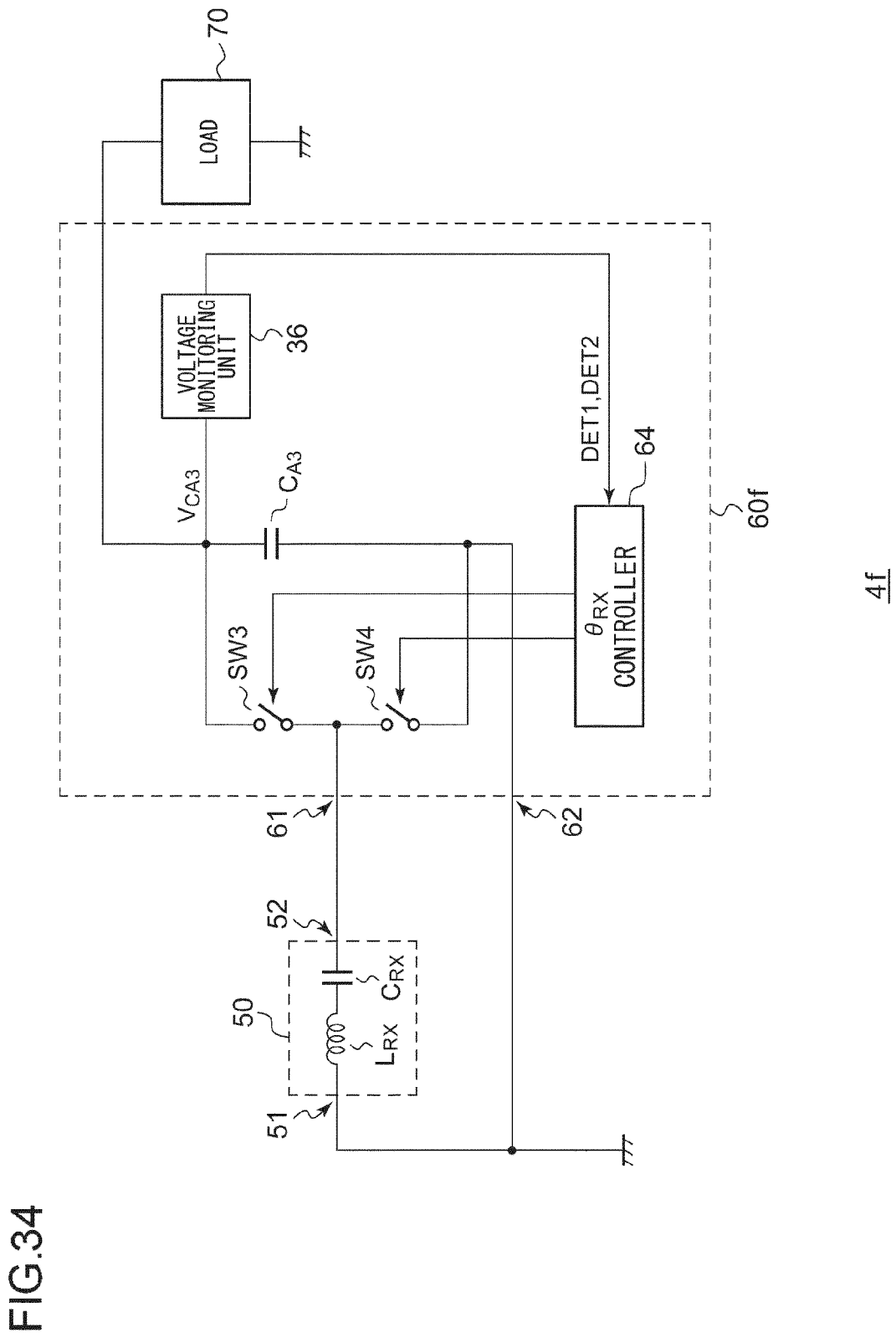
FIG. 34 is a block diagram showing a configuration of a wireless power receiving apparatus according to the third embodiment.

The voltage monitoring unit 36 may be provided to the automatic tuning assist circuit 60 included in the wireless power receiving apparatus 4. FIG. 34 is a block diagram showing a configuration of a wireless power receiving apparatus 4f according to the third embodiment. The wireless power receiving apparatus 4f has the same basic configuration as that of the wireless power receiving apparatus 4 shown in FIG. 14. An automatic tuning assist circuit 60f shown in FIG. 34 further includes the voltage monitoring unit 36, in addition to the multiple switches SW3 and SW4 and the third auxiliary capacitor $C_{A3}$.

The operation performed by the voltage monitoring unit 36 is the same as in a case in which the voltage monitoring unit 36 is provided to the wireless power transmitting apparatus 2f. Accordingly, description thereof will be omitted.

In the same way as with the wireless power transmitting apparatus, in the wireless power receiving apparatus, the voltage $V_{CA3}$ that develops at the auxiliary capacitor $C_{A3}$ of the automatic tuning assist circuit 60f changes according to a change in the condition for resonance. Thus, by monitoring the capacitor voltage $V_{CA3}$, such an arrangement is capable of detecting an event that disturbs the resonant state.

The above is a description of the wireless power receiving apparatus 4f according to the third embodiment. It should be noted that the configurations of the automatic tuning assist circuit and the wireless power receiving apparatus are not restricted to those shown in FIG. 34. That is to say, the voltage monitoring unit 36 may be provided to various kinds of circuits described in the first and second embodiments. Specifically, the voltage monitoring unit 36 may be provided to the automatic tuning assist circuit 60 shown in any one of FIGS. 17A, 17B, 18, 19A, 19B, and 20. Also, the voltage monitoring unit 36 may be provided to the automatic tuning assist circuit 90 shown in any one of FIG. 26, FIGS. 28A through 28D, and FIG. 29. Alternatively, the voltage monitoring unit 36 may be provided to modifications of the automatic tuning assist circuit 60 or 90. In a case in which multiple auxiliary capacitors are provided, the voltage monitoring unit 36 may monitor the voltage that develops at one selected from among the multiple auxiliary capacitors. Also, the voltage monitoring unit 36 may monitor multiple voltages across the respective multiple auxiliary capacitors at the same time.

Description has been made regarding the present invention with reference to the third embodiment. The above-described embodiment has been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made regarding such modifications.

Description has been made in the embodiment regarding an arrangement in which the voltage monitoring unit 36 detects an event that disturbs a resonant state based on the voltage that develops at the auxiliary capacitor. Also, instead of monitoring the voltage across the auxiliary capacitor, other suitable voltages may be monitored, examples of which include: the correction voltage $V_A$ that develops at the first terminal 31 of the automatic tuning assist circuit 30; the correction voltage $V_A$ that develops at the first terminal 61 of the automatic tuning assist circuit 60; the correction voltage $V_A$ that develops at the first terminal 81 of the automatic tuning assist circuit 80; and the correction voltage $V_A$ that develops at the first terminal 91 of the automatic tuning assist circuit 90. Such arrangements also are encompassed within the technical scope of the present invention.

While the preferred embodiments of the present invention have been described using specific terms, such description is for illustrative purposes only, and it is to be understood that changes and variations may be made without departing from the spirit or scope of the appended claims.

What is claimed is:

1. A wireless power transmitting apparatus which transmits an electric power signal comprising any one from among an electric field, a magnetic field, and an electromagnetic field to a wireless power receiving apparatus, the wireless power transmitting apparatus comprising:
    a transmission antenna comprising a transmission coil;
    an automatic tuning assist circuit coupled in series with the transmission antenna; and
    a power supply that applies an AC driving voltage across a series circuit including the transmission antenna and the automatic tuning assist circuit,
    wherein the automatic tuning assist circuit comprises:
        a first terminal;
        a second terminal;
        N (N represents an integer) auxiliary capacitors;
        a plurality of switches each of which is arranged between two terminals from among the first terminal, the second terminal, and terminals of the N auxiliary capacitors;
        a controller that switches on and off each of the plurality of switches in synchronization with the driving voltage with a predetermined phase difference with respect to the driving voltage; and
        a voltage monitoring unit that monitors a voltage that develops at at least one from among the N auxiliary capacitors.

2. The wireless power transmitting apparatus according to claim 1, wherein the voltage monitoring unit judges whether or not the voltage that develops at the auxiliary capacitor is within a predetermined range.

3. The wireless power transmitting apparatus according to claim 1, wherein the voltage monitoring unit monitors a waveform obtained by time differentiating the voltage that develops at the auxiliary capacitor.

4. The wireless power transmitting apparatus according to claim 1, wherein the plurality of switches includes a first switch and a second switch,
    and wherein the N auxiliary capacitors include a first auxiliary capacitor,
    and wherein the first switch and the first auxiliary capacitor are arranged in series between the first terminal and the second terminal,
    and wherein the second switch is arranged in parallel with a circuit that comprises the first switch and the first auxiliary capacitor between the first terminal and the second terminal.

5. The wireless power transmitting apparatus according to claim 4, wherein the automatic tuning assist circuit further comprises a second auxiliary capacitor arranged in series with the second switch between the first terminal and the second terminal.

6. The wireless power transmitting apparatus according to claim 1, wherein the plurality of switches comprises:
    a first switch and a second switch arranged in series between the first terminal and the second terminal; and
    a third switch and a fourth switch sequentially arranged in series between the first terminal and the second terminal such that they are arranged in parallel with a circuit that comprises the first switch and the second switch,
    and wherein the N auxiliary capacitors include a fifth auxiliary capacitor,
    and wherein the fifth auxiliary capacitor is arranged between a connection node that connects the first switch and the second switch and a connection node that connects the third switch and the fourth switch.

7. A wireless power supply system comprising:
    the wireless power transmitting apparatus according to claim 1; and
    a wireless power receiving apparatus that receives an electric power signal from the wireless power transmitting apparatus.

8. A wireless power receiving apparatus that receives an electric power signal comprising any one from among an electric field, a magnetic field, and an electromagnetic field transmitted from a wireless power receiving apparatus, the wireless power receiving apparatus comprising:
    a reception antenna comprising a reception coil; and
    an automatic tuning assist circuit coupled in series with the reception antenna,
    wherein the automatic tuning assist circuit comprises:
        a first terminal;
        a second terminal;
        N (N represents an integer) auxiliary capacitors;
        a plurality of switches each of which is arranged between two terminals from among the first terminal, the second terminal, and terminals of the N auxiliary capacitors;
        a controller that switches on and off each of the plurality of switches in synchronization with the electric power signal; and a voltage monitoring unit that monitors a voltage that develops at at least one from among the N auxiliary capacitors.

9. The wireless power receiving apparatus according to claim 8, wherein the voltage monitoring unit judges whether or not the voltage that develops at the auxiliary capacitor is within a predetermined range.

10. The wireless power receiving apparatus according to claim 8, wherein the voltage monitoring unit monitors a waveform obtained by time differentiating the voltage that develops at the auxiliary capacitor.

11. The wireless power receiving apparatus according to claim 8, wherein the plurality of switches includes a third switch and a fourth switch, and wherein the N auxiliary capacitors include a third auxiliary capacitor, and wherein the third switch and the third auxiliary capacitor are arranged in series between the first terminal and the second terminal, and wherein the fourth switch is arranged in parallel with a circuit that comprises the third switch and the third auxiliary capacitor between the first terminal and the second terminal.

12. The wireless power receiving apparatus according to claim 11, wherein the automatic tuning assist circuit further comprises a fourth auxiliary capacitor arranged in series with the fourth switch between the first terminal and the second terminal.

13. The wireless power receiving apparatus according to claim 8, wherein the plurality of switches comprises:

a fifth switch and a sixth switch arranged in series between the first terminal and the second terminal; and a seventh switch and an eighth switch sequentially arranged in series between the first terminal and the second terminal such that they are arranged in parallel with a circuit that comprises the fifth switch and the sixth switch, and wherein the N auxiliary capacitors include a sixth auxiliary capacitor, and wherein the sixth auxiliary capacitor is arranged between a connection node that connects the fifth switch and the sixth switch and a connection node that connects the seventh switch and the eighth switch.

14. A wireless power supply system comprising:

a wireless power transmitting apparatus that transmits an electric power signal comprising any one from among an electric field, a magnetic field, and an electromagnetic field; and the wireless power receiving apparatus according to claim 8, which receives the electric power signal.

* * * * *